US012655970B2

(12) United States Patent

Eilmus et al.

(10) Patent No.: US 12,655,970 B2

(45) Date of Patent: Jun. 16, 2026

(54) SINK LIGHTING SYSTEM

(71) Applicant: Kohler Co., Kohler, WI (US)

(72) Inventors: Niels J. Eilmus, Sheboygan, WI (US); Steven F. Ellingsen, Plymouth, WI (US)

(73) Assignee: Kohler Co., Kohler, WI (US)

(*) Notice: Subject to any disclaimer, the term of this patent is extended or adjusted under 35 U.S.C. 154(b) by 0 days.

(21) Appl. No.: 18/807,511

(22) Filed: Aug. 16, 2024

(65) Prior Publication Data

US 2025/0052412 A1 Feb. 13, 2025

Related U.S. Application Data

(63) Continuation of application No. 17/346,508, filed on Jun. 14, 2021, now Pat. No. 12,066,179.

(Continued)

(51) Int. Cl.

*F21V 33/00* (2006.01)

*E03C 1/182* (2006.01)

(Continued)

(52) U.S. Cl.

CPC ............ *F21V 33/006* (2013.01); *E03C 1/182* (2013.01); *F21V 23/003* (2013.01); *F21V 23/0442* (2013.01)

(58) Field of Classification Search

CPC .. F21V 33/006; F21V 23/003; F21V 23/0442; E03C 1/182

See application file for complete search history.

(56) References Cited

U.S. PATENT DOCUMENTS

| | | | |
|---|---|---|---|
| 208,094 | A | 9/1878 | Higgins |
| 526,390 | A | 9/1894 | Glauber |

(Continued)

FOREIGN PATENT DOCUMENTS

| | | | |
|---|---|---|---|
| CN | 1229626 | A | 9/1999 |
| CN | 1757837 | A | 4/2006 |

(Continued)

OTHER PUBLICATIONS

Screen capture from Dawn USA showing HTML coding with product installation manual date. Retrieved from http://dawnusa.net/productsee4. Screen capture from amazon. com showing earliest available date for sink model DAF3320C dated Oct. 16, 2017 (2 pages).

(Continued)

*Primary Examiner* — Thomas M Sember

(74) *Attorney, Agent, or Firm* — Husch Blackwell LLP

(57) ABSTRACT

A sink system includes a basin, an apron, and a lighting system. The basin includes a bottom wall, a drain, a front wall, and a basin rim. The drain is disposed within the bottom wall. The front wall is contiguous with the bottom wall. The basin rim is contiguous with the front wall and separated from the bottom wall by the front wall. The apron is coupled to the basin rim. The apron includes an apron panel wall that has an interior surface and an exterior surface opposite the interior surface. The interior surface is in confronting relation with the front wall. The lighting system includes an apron lighting element and a controller. The apron lighting element is coupled to the apron. The apron lighting element is configured to provide illumination to an apron illumination target disposed on the exterior surface.

19 Claims, 23 Drawing Sheets

Related U.S. Application Data

(60) Provisional application No. 63/045,591, filed on Jun. 29, 2020.

(51) Int. Cl.
*F21V 23/00* (2015.01)
*F21V 23/04* (2006.01)

(56) References Cited

U.S. PATENT DOCUMENTS

| | | | |
|---|---|---|---|
| 594,962 | A | 12/1897 | Mcmanus |
| 792,498 | A | 6/1905 | George |
| 832,309 | A | 10/1906 | John |
| 915,057 | A | 3/1909 | Louis |
| 948,954 | A | 2/1910 | James et al. |
| 958,857 | A | 5/1910 | Mollie |
| 981,448 | A | 1/1911 | Harry |
| 1,006,994 | A | 10/1911 | Thomas |
| 1,225,308 | A | 5/1917 | Julius |
| 1,408,812 | A | 3/1922 | Leighton |
| 1,576,607 | A | 3/1926 | Hasskarl |
| 1,579,374 | A | 4/1926 | Leighton |
| 1,587,693 | A | 6/1926 | Beland et al. |
| 1,618,032 | A | 2/1927 | Wilkes |
| 1,880,733 | A | 10/1932 | Bolhuis |
| 1,986,935 | A | 1/1935 | Levine |
| 2,005,459 | A | 6/1935 | Finn |
| 2,045,965 | A | 6/1936 | Rosen |
| 2,065,347 | A | 12/1936 | Schulse |
| 2,098,374 | A | 11/1937 | Bullock |
| 2,131,111 | A | 9/1938 | Marsh |
| 2,141,347 | A | 12/1938 | Davis |
| 2,194,343 | A | 3/1940 | Wexler |
| 2,308,123 | A | 1/1943 | Stein |
| 2,309,851 | A | 2/1943 | Kuhne |
| 2,341,093 | A | 2/1944 | Haberstump |
| 2,367,161 | A | 1/1945 | Wild |
| 2,441,752 | A | 5/1948 | Campbell |
| 2,457,918 | A | 1/1949 | Pierce |
| 2,473,862 | A | 6/1949 | Clawsey |
| 2,508,808 | A | 5/1950 | Warman |
| 2,510,238 | A | 6/1950 | Mau |
| 2,534,793 | A | 12/1950 | Olson |
| 2,597,925 | A | 5/1952 | Edger |
| 2,668,300 | A | 2/1954 | Grill |
| 2,691,237 | A | 10/1954 | Heim |
| 2,818,579 | A | 1/1958 | Katz |
| 2,825,177 | A | 3/1958 | Nordlof et al. |
| 2,853,750 | A | 9/1958 | Da Vies et al. |
| D184,799 | S | 4/1959 | Clemens |
| D188,090 | S | 6/1960 | Rasmussen |
| 2,977,082 | A | 3/1961 | Harris |
| 2,988,755 | A | 6/1961 | Roland |
| 3,023,991 | A | 3/1962 | Fisher |
| 3,051,160 | A | 8/1962 | Nielsen |
| 3,070,812 | A | 1/1963 | Skrmetta |
| 3,142,295 | A | 7/1964 | Blee |
| 3,169,743 | A | 2/1965 | Page |
| 3,204,601 | A | 9/1965 | Staver |
| 3,289,218 | A | 12/1966 | Mehilos |
| 3,289,990 | A | 12/1966 | Grantham |
| 3,472,391 | A | 10/1969 | Gino |
| 3,502,384 | A | 3/1970 | Ethel |
| D217,164 | S | 4/1970 | Jarema |
| 3,508,282 | A | 4/1970 | Gerard |
| D218,330 | S | 8/1970 | Hagopian |
| 3,552,705 | A | 1/1971 | Caster |
| D222,087 | S | 9/1971 | Hagopian |
| 3,625,162 | A | 12/1971 | Crew |
| D223,501 | S | 4/1972 | Hamburg |
| 3,680,152 | A | 8/1972 | Farrell |
| 3,742,965 | A | 7/1973 | Hudziak |
| 3,813,706 | A | 6/1974 | Williams |
| 3,827,020 | A | 7/1974 | Okamoto |
| 4,033,461 | A | 7/1977 | Nevai |
| 4,041,964 | A | 8/1977 | Shamoon |
| 4,082,391 | A | 4/1978 | Turner |
| D249,207 | S | 9/1978 | Emmer |
| 4,114,967 | A | 9/1978 | Weekly |
| D253,147 | S | 10/1979 | Heckler |
| D253,148 | S | 10/1979 | Heckler |
| D253,149 | S | 10/1979 | Heckler |
| 4,207,975 | A | 6/1980 | Arzillo |
| 4,305,166 | A | 12/1981 | Rose |
| 4,351,073 | A | 9/1982 | Elsas |
| 4,357,957 | A | 11/1982 | Bisona et al. |
| 4,370,762 | A | 2/1983 | Heil |
| 4,387,738 | A | 6/1983 | Bisonaya et al. |
| 4,456,021 | A | 6/1984 | Vens |
| 4,458,705 | A | 7/1984 | Cawood |
| D277,820 | S | 3/1985 | Yeh |
| 4,531,246 | A | 7/1985 | Earley |
| 4,698,861 | A | 10/1987 | Bogusz |
| 4,720,879 | A | 1/1988 | Rabban |
| 4,884,714 | A | 12/1989 | Bechtel |
| 5,012,537 | A | 5/1991 | Underwood |
| 5,181,285 | A | 1/1993 | Kolada |
| 5,199,119 | A | 4/1993 | Weber |
| 5,217,123 | A | 6/1993 | Riley et al. |
| 5,232,189 | A | 8/1993 | Koch |
| 5,239,711 | A | 8/1993 | Tafur |
| 5,253,752 | A | 10/1993 | Jang |
| D341,049 | S | 11/1993 | Hugh |
| 5,275,363 | A | 1/1994 | Dennis |
| 5,279,007 | A | 1/1994 | Kolada |
| 5,367,278 | A | 11/1994 | Yoshikawa |
| 5,368,268 | A | 11/1994 | Jodwischat |
| D353,652 | S | 12/1994 | Dannenberg |
| 5,377,941 | A | 1/1995 | Har et al. |
| D358,457 | S | 5/1995 | Dannenberg |
| 5,417,397 | A | 5/1995 | Harnett |
| D365,235 | S | 12/1995 | Jodwischat |
| 5,485,859 | A | 1/1996 | Johnson et al. |
| 5,485,927 | A | 1/1996 | Hubbard |
| D375,219 | S | 11/1996 | Selent |
| 5,590,804 | A | 1/1997 | Crum et al. |
| 5,642,871 | A | 7/1997 | Repert et al. |
| 5,715,547 | A | 2/1998 | Becker et al. |
| 5,864,898 | A | 2/1999 | Knapp et al. |
| 5,865,325 | A | 2/1999 | Comstock |
| 5,940,906 | A | 8/1999 | Halloran |
| 5,947,439 | A | 9/1999 | Florey |
| D421,490 | S | 3/2000 | Talerico |
| 6,062,397 | A | 5/2000 | Licari |
| 6,092,772 | A | 7/2000 | Garcia et al. |
| 6,154,895 | A | 12/2000 | Pisklak |
| 6,212,707 | B1 | 4/2001 | Thompson et al. |
| 6,216,992 | B1 | 4/2001 | Bisonaya et al. |
| 6,223,362 | B1 | 5/2001 | Liang |
| D444,216 | S | 6/2001 | Katz et al. |
| D444,548 | S | 7/2001 | Katz et al. |
| D444,549 | S | 7/2001 | Katz et al. |
| 6,276,675 | B1 | 8/2001 | Shamoon |
| D451,585 | S | 12/2001 | Svendsen et al. |
| 6,330,948 | B1 | 12/2001 | Leto |
| 6,338,171 | B1 | 1/2002 | Dandridge |
| 6,341,704 | B1 | 1/2002 | Michel |
| 6,341,770 | B1 | 1/2002 | Landherr |
| D458,493 | S | 6/2002 | Cascio |
| D458,494 | S | 6/2002 | Cascio |
| 6,446,280 | B1 | 9/2002 | Moore |
| D473,294 | S | 4/2003 | Genslak et al. |
| 6,543,071 | B1 | 4/2003 | Lenner |
| 6,557,956 | B2 | 5/2003 | Hightower |
| 6,564,398 | B1 | 5/2003 | Trott |
| D477,949 | S | 8/2003 | Cascio et al. |
| D477,950 | S | 8/2003 | Cascio et al. |
| D478,444 | S | 8/2003 | Cascio et al. |
| 6,619,604 | B1 | 9/2003 | Stillman |
| 6,658,677 | B2 | 12/2003 | Paul |
| D484,956 | S | 1/2004 | Rachiele |
| D492,983 | S | 7/2004 | Rachiele |
| D494,257 | S | 8/2004 | Moran et al. |
| D494,665 | S | 8/2004 | Herbeau |

(56) References Cited

U.S. PATENT DOCUMENTS 6,793,190 B2 9/2004 White et al.
6,793,193 B2 9/2004 de Groote
6,808,147 B2 10/2004 Brannen et al.
D498,291 S 11/2004 Bayer
D499,468 S 12/2004 Trepanier
D499,799 S 12/2004 Trepanier
D499,800 S 12/2004 Trepanier
D501,041 S 1/2005 Moran et al.
D501,541 S 2/2005 Gordon
6,857,616 B1 2/2005 Gasperi et al.
6,910,604 B2 6/2005 Gugliotti et al.
D507,041 S 7/2005 Douglass et al.
D508,984 S 8/2005 Gordon
6,929,232 B1 8/2005 Gasperi et al.
6,991,200 B2 1/2006 Stillman
D518,560 S 4/2006 Arkay-Leliever
D520,611 S 5/2006 Wozniczka et al.
D520,612 S 5/2006 Wozniczka et al.
7,039,963 B2 5/2006 Loberger et al.
D525,689 S 7/2006 Wozniczka et al.
7,086,099 B2 8/2006 Rocci
D527,808 S 9/2006 Wozniczka et al.
D529,148 S 9/2006 Douglass
D529,999 S 10/2006 Lonneman et al.
D530,001 S 10/2006 Lonneman et al.
D530,403 S 10/2006 Lonneman et al.
D530,404 S 10/2006 Lonneman et al.
D530,405 S 10/2006 Douglass et al.
D530,797 S 10/2006 Lonneman et al.
D537,149 S 2/2007 Douglass et al.
7,178,886 B2 2/2007 Hightower
D537,997 S 3/2007 Plikuhn
D538,497 S 3/2007 Plikuhn
D539,396 S 3/2007 Plikuhn et al.
D544,074 S 6/2007 Douglass et al.
D545,408 S 6/2007 Plikuhn
D545,409 S 6/2007 Plikuhn
D546,426 S 7/2007 Plikuhn
D546,929 S 7/2007 Schneider et al.
D547,838 S 7/2007 Plikuhn
7,246,387 B2 7/2007 Erickson et al.
D548,311 S 8/2007 Mahon
D551,742 S 9/2007 Plikuhn
D552,222 S 10/2007 Tortorello
7,278,175 B2 10/2007 Torres
D556,297 S 11/2007 Baade et al.
D556,848 S 12/2007 Ruggiero et al.
D556,868 S 12/2007 Tortorello
D558,311 S 12/2007 Adams
7,305,723 B2 12/2007 Fulks
D559,366 S 1/2008 Chong
7,377,661 B2 5/2008 Douglass
D573,701 S 7/2008 Rachiele
7,424,949 B2 9/2008 Kumar
D585,126 S 1/2009 Eilmus et al.
7,481,473 B1 1/2009 Warning
D587,789 S 3/2009 Drake
D587,790 S 3/2009 Tortorello et al.
D588,677 S 3/2009 Drake
D588,678 S 3/2009 Chong et al.
D588,679 S 3/2009 Cheng
D588,680 S 3/2009 Cheng
D588,685 S 3/2009 Chong
D589,222 S 3/2009 Gicela et al.
7,503,534 B2 3/2009 Pollack
7,568,239 B2 8/2009 Spruner von Mertz et al.
7,578,399 B1 8/2009 Mulaw
D600,334 S 9/2009 Chong
7,594,706 B2 9/2009 Styka et al.
D603,026 S 10/2009 Deboer et al.
D603,027 S 10/2009 Deboer et al.
D603,029 S 10/2009 Bucher
D603,334 S 11/2009 Suzuki
D603,486 S 11/2009 Mayer et al.
7,699,277 B2 4/2010 Bagnall
7,721,362 B2 5/2010 Martin et al.
7,726,521 B2 6/2010 Bassett et al.
7,731,846 B1 6/2010 Jones
7,735,661 B1 6/2010 Sumner et al.
D624,635 S 9/2010 Eckhaus
D627,449 S 11/2010 Eckhaus
7,841,473 B2 11/2010 Huang et al.
7,854,030 B2 12/2010 Lee et al.
D636,138 S 4/2011 Talerico
8,070,148 B2 12/2011 Nishida
D651,699 S 1/2012 Booth et al.
8,088,468 B2 1/2012 Maggio
8,096,678 B2 1/2012 Jones et al.
D655,798 S 3/2012 Miller et al.
D657,028 S 4/2012 Eilmus
8,185,980 B2 5/2012 Adams et al.
D662,574 S 6/2012 Booth et al.
D663,389 S 7/2012 Miller et al.
D663,395 S 7/2012 Miller et al.
8,214,939 B2 7/2012 Spurlock
8,296,876 B2 10/2012 Yang et al.
D670,364 S 11/2012 Miller et al.
D670,366 S 11/2012 Booth et al.
D670,367 S 11/2012 Miller et al.
D671,197 S 11/2012 Miller et al.
D675,300 S 1/2013 Miller et al.
8,393,022 B2 3/2013 Dachowski
D682,998 S 5/2013 Eilmus
D685,456 S 7/2013 Eckhaus
D685,457 S 7/2013 Eckhaus
8,484,916 B2 7/2013 Farag
8,511,762 B2 8/2013 Stegerwald
D698,905 S 2/2014 Ziemann et al.
D699,012 S 2/2014 Ziemann et al.
D699,013 S 2/2014 Ziemann et al.
D699,330 S 2/2014 Ziemann et al.
D700,301 S 2/2014 Rachiele
8,684,192 B1 4/2014 Margolin
8,801,926 B2 8/2014 Housley
8,844,070 B2 9/2014 Booth et al.
8,870,306 B2 10/2014 Simon
8,925,124 B2 1/2015 Littlehorn
D722,145 S 2/2015 Morales et al.
D725,757 S 3/2015 Morales et al.
9,032,567 B1 5/2015 Galgano
9,066,631 B2 6/2015 Didehvar et al.
9,073,096 B2 7/2015 Ehman
9,085,884 B2 7/2015 Lopchinsky
9,115,484 B2 8/2015 Fulford et al.
9,173,487 B2 11/2015 Booth et al.
9,226,621 B1 1/2016 Jones et al.
9,228,331 B1 1/2016 Weinstein
9,238,907 B2 1/2016 Murray
9,260,845 B1 2/2016 Siegel
9,291,301 B2 3/2016 Brinkmann
9,380,917 B2 7/2016 Eilmus et al.
9,414,717 B2 8/2016 Tollasepp et al.
9,416,538 B2 8/2016 Torres et al.
9,427,135 B2 8/2016 Audet et al.
9,567,735 B2 2/2017 Siegel
9,574,333 B2 2/2017 O'Brien et al.
9,622,621 B2 4/2017 Brinkmann
9,708,064 B2 7/2017 Vandewall et al.
9,750,375 B2 9/2017 Byun
D799,648 S 10/2017 Chong
D799,649 S 10/2017 Chong
9,775,470 B2 10/2017 Eilmus et al.
9,783,967 B2 10/2017 Jain et al.
9,790,671 B2 10/2017 Jones et al.
9,808,123 B1 11/2017 Brinkmann
D804,620 S 12/2017 Palazzolo et al.
D816,197 S 4/2018 Chong et al.
9,930,998 B2 4/2018 Palazzolo et al.
D821,670 S 6/2018 Lynch
D824,628 S 7/2018 Lynch
10,092,097 B2 10/2018 Booth et al.
10,151,085 B2 12/2018 Chong et al.
D845,451 S 4/2019 Swilley
D861,837 S 10/2019 Chong et al.

(56) References Cited

U.S. PATENT DOCUMENTS

| | | | |
|---|---|---|---|
| D865,138 | S | 10/2019 | Lyons |
| 10,501,919 | B2 | 12/2019 | Chong et al. |
| D872,243 | S | 1/2020 | Wegner et al. |
| D886,255 | S | 6/2020 | Wegner et al. |
| D911,497 | S | 2/2021 | Levi |
| 2004/0016052 | A1 | 1/2004 | Domenig |
| 2005/0044625 | A1 | 3/2005 | Kommers |
| 2005/0155147 | A1 | 7/2005 | Trepanier et al. |
| 2005/0223486 | A1 | 10/2005 | Jumalon |
| 2007/0157378 | A1 | 7/2007 | Kendall et al. |
| 2009/0094741 | A1 | 4/2009 | Valadez et al. |
| 2009/0139023 | A1 | 6/2009 | Talerico |
| 2009/0172876 | A1 | 7/2009 | Hendrickson et al. |
| 2009/0314730 | A1 | 12/2009 | Mansikkamaa |
| 2010/0072147 | A1 | 3/2010 | Reenberg et al. |
| 2010/0116955 | A1 | 5/2010 | Hayes et al. |
| 2010/0148896 | A1 | 6/2010 | Hugo |
| 2010/0213145 | A1 | 8/2010 | Swank |
| 2010/0254125 | A1 | 10/2010 | Jones et al. |
| 2010/0275367 | A1 | 11/2010 | Bager et al. |
| 2010/0275368 | A1 | 11/2010 | Miller et al. |
| 2010/0275369 | A1 | 11/2010 | Eilmus et al. |
| 2011/0056016 | A1 | 3/2011 | Mun |
| 2011/0101199 | A1 | 5/2011 | Andrade |
| 2011/0163510 | A1 | 7/2011 | Wedi |
| 2011/0219535 | A1 | 9/2011 | Bouroullec et al. |
| 2011/0303626 | A1 | 12/2011 | Roenne |
| 2012/0169192 | A1 | 7/2012 | Simon |
| 2012/0222211 | A1 | 9/2012 | Booth et al. |
| 2012/0240330 | A1 | 9/2012 | Fulford et al. |
| 2013/0337220 | A1 | 12/2013 | Janke |
| 2014/0041113 | A1 | 2/2014 | Mobbs |
| 2014/0245533 | A1 | 9/2014 | Lee et al. |
| 2014/0259381 | A1 | 9/2014 | Fogerlie |
| 2014/0346102 | A1 | 11/2014 | Housley |
| 2014/0366263 | A1 | 12/2014 | Thompson et al. |
| 2015/0122961 | A1 | 5/2015 | Batiste et al. |
| 2015/0128339 | A1 | 5/2015 | Warner |
| 2015/0230667 | A1 | 8/2015 | Palazzolo et al. |
| 2015/0284937 | A1 | 10/2015 | Baier et al. |
| 2016/0045027 | A1 | 2/2016 | Alkoby |
| 2016/0215484 | A1 | 7/2016 | Williams |
| 2016/0235201 | A1 | 8/2016 | Soot |
| 2016/0256804 | A1 | 9/2016 | Medeiros |
| 2017/0027387 | A1 | 2/2017 | Lakshmi Narasimhan |
| 2017/0130433 | A1 | 5/2017 | Franco |
| 2017/0172379 | A1 | 6/2017 | Keller et al. |
| 2017/0245693 | A1 | 8/2017 | Palazzolo et al. |
| 2017/0295960 | A1 | 10/2017 | Allen |
| 2018/0030702 | A1 | 2/2018 | Childs et al. |
| 2018/0030703 | A1 | 2/2018 | Cagliari et al. |
| 2018/0030704 | A1 | 2/2018 | Bomatter et al. |
| 2018/0030705 | A1 | 2/2018 | Bomatter et al. |
| 2018/0125305 | A1 | 5/2018 | Richards |
| 2018/0187400 | A1 | 7/2018 | Chong et al. |
| 2018/0187401 | A1 | 7/2018 | Chong et al. |
| 2018/0187403 | A1 | 7/2018 | Chong et al. |
| 2020/0063412 | A1 | 2/2020 | Miller et al. |
| 2020/0199858 | A1 | 6/2020 | Eilmus et al. |
| 2020/0352331 | A1 | 11/2020 | Graf |
| 2020/0407957 | A1 | 12/2020 | Vaught |

FOREIGN PATENT DOCUMENTS

| | | | |
|---|---|---|---|
| CN | 1938495 | A | 3/2007 |
| CN | 102791919 | A | 11/2012 |
| CN | 104912281 | A | 9/2015 |
| CN | 105496036 | A | 4/2016 |
| CN | 105908812 | A | 8/2016 |
| CN | 207285669 | U | 5/2018 |
| DE | 2658193 | B1 | 7/1978 |
| DE | 3928806 | A1 | 11/1990 |
| EP | 0534517 | A1 | 3/1993 |
| EP | 0968078 | A1 | 1/2000 |
| EP | 1442691 | A1 | 8/2004 |
| EP | 2168750 | A1 | 3/2010 |
| EP | 2194196 | A2 | 6/2010 |
| EP | 2803772 | A2 | 11/2014 |
| EP | 3670768 | A1 | 6/2020 |
| ES | 2301357 | A1 | 6/2008 |
| FR | 2887416 | B1 | 11/2008 |
| GB | 2214127 | A | 8/1989 |
| JP | 1980055842 | A | 4/1980 |
| JP | 937863 | A | 2/1997 |
| JP | H119487 | A | 1/1999 |
| JP | H119488 | A | 1/1999 |
| JP | H11-346951 | A | 12/1999 |
| JP | 5088124 | B2 | 12/2012 |
| WO | 2012069682 | A1 | 5/2012 |
| WO | 2012134118 | A2 | 10/2012 |
| WO | 2016062519 | A1 | 4/2016 |

OTHER PUBLICATIONS

Kraus Bellucci Sink Collection Video Snippets, https://www.youtube.com/watch?v=O_MFn1JLOTg#action=share, accessed Sep. 14, 2020, pp. 1-8.
Rachiele; "Patented copper apron tront sink with channel;" http://www.rachiele.com/copper.sub.--apron.sub.--sinks-with-patent.asp; retrieval date: Nov. 30, 2011; 3 pages.
Songbath.com. Apron Front Kitchen Sink. Songbath.com online catalog. (1 page).
Chinese Office Action on CN Appl. Ser. No. 201910763481.4 dated Jul. 30, 2020 (11 pages).
Bellucci Workstation 33" Quartz Composite Single Bowl Farmhouse Kitchen Sink in Metallic Brown, https://www.kraususa.com/kraus-kgf2-33mbr-workstation-33-quartz-composite-single-bowl-farmhouse-kitchen-sink-in-metallic-brown.html, accessed Sep. 14, 2020, pp. 1-4.
First Indian Examination Report on IN Appl. Ser. No. 202114003243 dated Jan. 12, 2022 (7 pages).
Kraus Specification Sheet, "KGF1-33 33 Inch Single Bowl Granite Farmhouse Apron Kitchen Sink," www.kraususa.com, Jun. 10, 2019, 1 page.
European Search Report on EP 21153120.7 dated Jun. 28, 2021 (9 pages).
Grainger Approved—Expanding Push in Rivet, Plastic L, 10mm, Black, https://www.grainger.com/product/GRAINGER-APPROVED-Expanding-Push-In-Rivet-5ZDW0, accessed Jun. 29, 2020, 2 pages.
Kohler Co. "Dickinson Apron-Front, Tile-in Kitchen Sink". Model No. K-6546-4U. Kohler Co. online catalog. Copyright 2011 Kohler Co. (3 pages).
Bellucci by Kraus—Flat Apron-Front Farmhouse Kitchen Sink Video Snippets, https://www.youtube.com/watch?v=bzwDrUpAPUg, accessed Sep. 14, 2020, pp. 1-7.
Blanco America, "Blanco's New One Stainless Steel Sinks," retrieved from https://youtu.be/lTta7oPFXgA, pp. 1-19 (2014). https://youtu.be/lTta7oPFXgA; accessed Jan. 5, 2021.
Shaws Original. Apron Sink. (1 page).
European Search Report on EP 21153093.6 dated Jun. 9, 2021 (20 pages).
Texas Lightsmith Luminescent Sinks, https://www.texaslightsmith.com/luminescent-sinks/, accessed Apr. 19, 2021, pp. 1-32.
"ELXUFP3620: Elkay Quartz Luxe 35-7/8"×20-15/16"×9" Single Bowl Farmhouse Sink with Perfect Drain," retrieved from https://www.elkay.com/products/elxufp3620.html, 2 pages (no date).
Lyons. "Premium 34 .times. 23 Apron Sink". Model No. KSxxAP3. 4. Lyons brochure. (3 pages).
Bellucci 33" Flat Apron Front Granite Quartz Composite Single Bowl Kitchen Sink in White, Model KGF1-33, https://www.kraususa.com/kraus-kgf1-33white-33-flat-apron-front-granite-quartz-composite-single-bowl-kitchen-sink-in-white.html, accessed Sep. 14, 2020, pp. 1-5.
"Blanco One™ Super Single Bowl," retrieved from https://www.blanco.com/en_us/en_us/sinks/product_catalog/sink.html?SID=BLANCO ONE Super SingleBowl&filter=true, 3 pages (no date).

(56) References Cited

OTHER PUBLICATIONS

Kraus Forteza KGF1-33 Farmhouse Apron Kitchen Sink, https://www.wayfair.com/home-improvement/pdp/kraus-forteza-33-I-x-21-w-farmhouseapron-kitchen-sink-kus10133.html?piid=40371630, accessed Sep. 14, 2020, pp. 1-9.
Elite Bath Chameleon Stainless, http://elitebath.com/stainless.html, accessed Apr. 19, 2021, pp. 1-2.
Kohler Fixtures, Apron Front Sinks, pp. 352-355 (2014).
Foreign Action other than Search Report on CN 201910763481.4 dated Jul. 30, 2020 (11 pages).
Bellucci 30" Flat Apron Front Granite Quartz Composite Single Bowl Kitchen Sink in Brown, https://www.kraususa.com/kraus-kgf1-30brown-30-flat-apron-front-granite-quartz-composite-single-bowl-kitchen-sink-in-brown.html, accessed Sep. 14, 2020, pp. 1-4.
Rohl. Apron Front Sink. (4 pages).
Extended European Search Report on EP Appln. Ser. No. 21153093.6 dated Sep. 22, 2021 (16 pages).
Bellucci 33" Flat Apron Front Granite Quartz Composite Single Bowl Kitchen Sink in Black, https://www.kraususa.com/kraus-kgf1-33black-33-flat-apron-front-granite-quartz-composite-single-bowl-kitchen-sink-in-black.html, accessed Sep. 14, 2020, pp. 1-5.
Standart Pro 33" Flat Apron Front 16 Guage Stainless Steel Single Bowl Kitchen Sink, Model KHF410-33, https://www.kraususa.com/kraus-khf410-33-33-flat-apron-front-16-gauge-stainless-steel-single-bowl-kitchen-sink.html, accessed Sep. 14, 2020, pp. 1-4.
Chinese Second Office Action on CN Patent Application No. 201910763481.4 dated Mar. 11, 2021 (7 pages).
Linkasink Farm House Kitchen Sink with Inset Apron Front, C071-30 Ss, https://static1.squarespace.com/static/5706844ee707eb7087c2faa7/t/590781fc1e5b6c7f60ac7e2f/1493664254854/c071-30_ss_spec_sheet.pdf, accessed Dec. 15, 2020, pp. 1-3.
Kallista. "For Loft by Michael S. Smith Fireclay Kitchen Sink with Drajnboard." Model No. L20300. Kallista.com online catalog. Copyright 2011 Kohler Co. (2 pages).
Belle Foret. "Apron Front Kitchen Sink". Model No. BFF1KIT. BelleForet.com online catalog. All Contents Copyright, Your Other Warehouse. (1 page).
FIFTV Kitchen & Bath Fixtures from Kraus USA Video Snippets, https://www.youtube.com/watch?v=48iJF4PKAqA, accessed Sep. 14, 2020, pp. 1-16.
Blanco America, "Blanco's New One Stainless Steel Sinks," retrieved from https://youtu.be/lTta7oPFXgA, pp. 1-19 (2014).
Kraus Installation Guide, "Bellucci Quartz Granite Composite Farmhouse Sink," KGF1-30 / KGF1-33, KGF2-30 / KGF2-33, KGF11-30 / KGF11-33, KGF12-30 / KGF12-33, www.kraususa.com, Feb. 19, 2019, pp. 1-15.
Kore Workstation 30" Apron Front 16 Guage Stainless Steel Single Bowl Kitchen Sink, https://www.kraususa.com/kraus-kwf410-30-workstation-30-apron-front-16-gauge-stainless-steel-single-bowl-kitchen-sink.html, accessed Sep. 14, 2020, pp. 1-4.
Extended European Search Report on EP Appl. Ser. No. 21180585.8 dated Nov. 9, 2021 (12 pages).
Foreign Action other than Search Report on CN 201910763481.4 dated Sep. 16, 2019 [no English translation].
Instawares.com. GSW Stainless Steel Corner Drain Sink Bowl—18.times.24in. Instawares.com online catalog. (1 page).
Wobane Under Cabinet Lighting Kit, https://www.amazon.com/Lighting-Flexible-LED-Cupboard-WarmWhite/dp/B07BF5PB4G/ref=pd_bxgy_img_2/130-1786452-9365555?encoding=UTF8&pd_rd_i=B07BF5PB4G&pd_rd_r=28e0b463-27d9-4394-bb05-97c57e6bfb1c&pd_rd_w=kLfbC&pd_rd_wg=3R6PF&pf_rd_p=4e3f7fc3-00c8-46a6-a4db-8457e6319578&pf_rd_r=0F23CBD7138W0BTR097T&psc=1&refRID=0F23CBD7138W0BTR097T, pp. 1-12, accessed Jun. 18, 2020.
FIFTV Kitchen & Bath Fixtures from Kraus USA Video Snippets, https://www.youtube.com/watch?v=48iJF4PKAqA, accessed Sep. 14, 2020, pp. 1-16 https://www.youtube.com/watch?v=48iJF4PKAqA; accessed Jan. 5, 2021.
Kraus Installation Guide, "Bellucci Quartz Granite Composite Farmhouse Sink with CeramTek," KGF1-30/KGF1-33, www.kraususa.com, Dec. 3, 2018, pp. 1-15.

SINK LIGHTING SYSTEM

CROSS-REFERENCE TO RELATED PATENT APPLICATION

This application is a continuation of U.S. Ser. No. 17/346,508, filed Jun. 14, 2021, which claims the benefit of and priority to U.S. Provisional Patent Application No. 63/045,591, filed on Jun. 29, 2020, the entire disclosures of which are hereby incorporated herein by reference.

BACKGROUND

The present disclosure relates generally to sink systems, and more particularly to sinks that incorporate a lighting system intended to, for example, provide enhanced functionality and aesthetic qualities for such sinks.

SUMMARY

In one embodiment, a sink system includes a basin, an apron, and a lighting system. The basin includes a bottom wall, a drain, a front wall, and a basin rim. The drain is disposed within the bottom wall. The front wall is contiguous with the bottom wall. The basin rim is contiguous with the front wall and separated from the bottom wall by the front wall. The apron is coupled to the basin rim. The apron includes an apron panel wall that has an interior surface and an exterior surface opposite the interior surface. The interior surface is in confronting relation with the front wall. The lighting system includes an apron lighting element and a controller. The apron lighting element is coupled to the apron. The apron lighting element is configured to provide illumination to an apron illumination target disposed on the exterior surface. The controller is in electronic communication with the apron lighting element and is configured to selectively cause the apron lighting element to provide illumination to the apron illumination target.

In another embodiment, a sink system includes a basin and a lighting system. The basin includes a bottom wall and a drain. The drain is disposed within the bottom wall. The lighting system includes a drain lighting element and a controller. The drain lighting element is coupled to the bottom wall proximate the drain. The drain lighting element is configured to provide illumination to a drain illumination target disposed on the bottom wall. The controller is in electronic communication with the drain lighting element and configured to selectively cause the drain lighting element to provide illumination to the drain illumination target.

In another embodiment, a sink system includes a basin, an apron, and a lighting system. The basin includes a bottom wall, a front wall, and a basin rim. The front wall is contiguous with the bottom wall. The basin rim is contiguous with the front wall and separated from the bottom wall by the front wall. The apron is coupled to the basin rim. The apron includes an apron panel wall and an apron spanning wall. The apron panel wall has an interior surface and an exterior surface opposite the interior surface. The interior surface is in confronting relation with the front wall. The apron spanning wall is contiguous with the apron panel wall and extending from the apron panel wall towards the front wall. The lighting system includes a floor lighting element and a controller. The floor lighting element is coupled to the apron spanning wall. The floor lighting element is configured to provide illumination to a floor illumination target. The controller is in electronic communication with the floor lighting element and configured to selectively cause the floor lighting element to provide illumination to the floor illumination target.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

Figure 1:
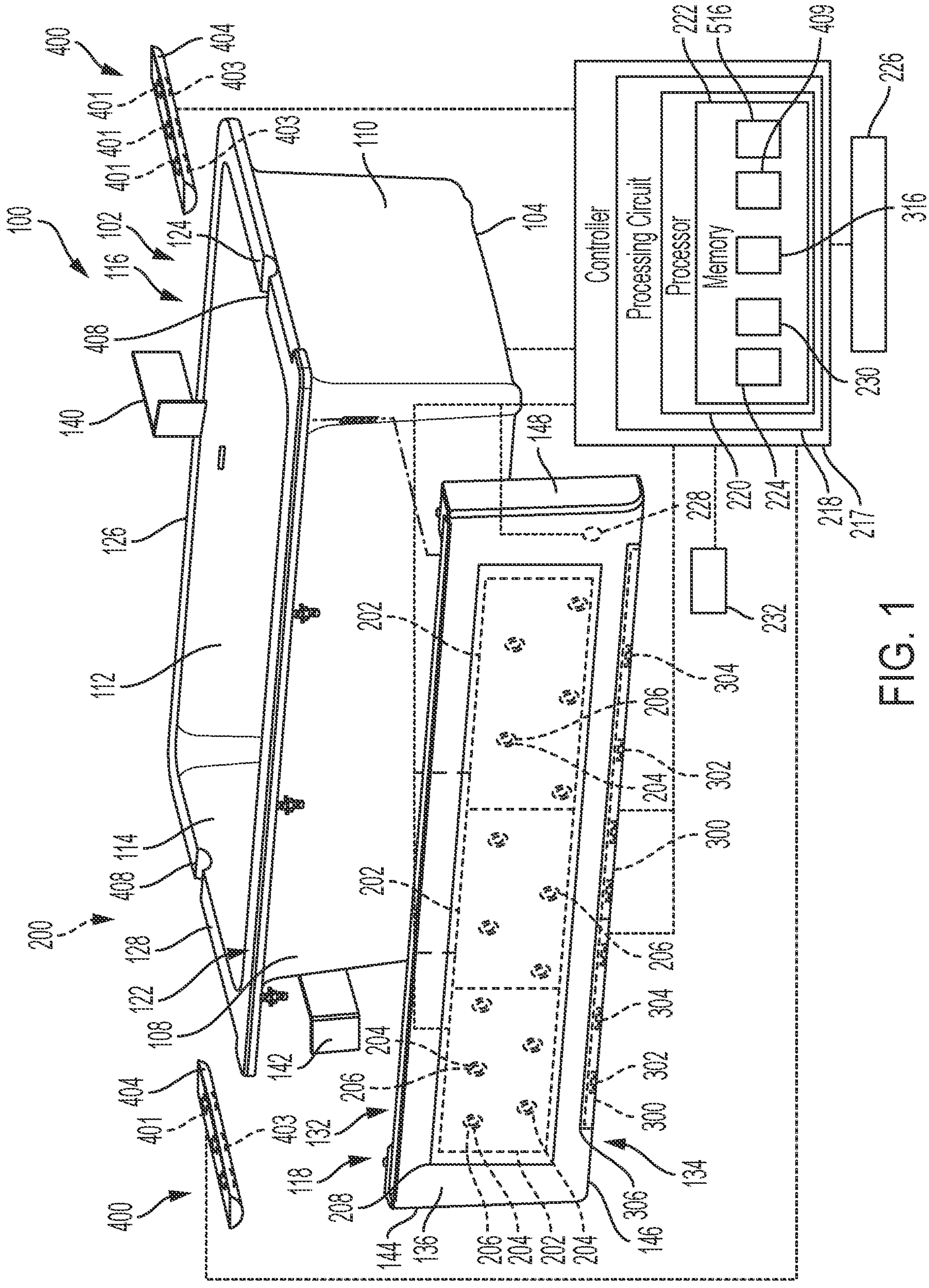
FIG. 1 is a front perspective and exploded view of a sink system, according to an example embodiment.

It will be recognized that some or all of the Figures are schematic representations for purposes of illustration. The Figures are provided for the purpose of illustrating one or more implementations with the explicit understanding that they will not be used to limit the scope or the meaning of the claims.

DETAILED DESCRIPTION

Before turning to the Figures, which illustrate certain example embodiments in detail, it should be understood that the present disclosure is not limited to the details or methodology set forth in the description or illustrated in the Figures. It should also be understood that the terminology used herein is for the purpose of description only and should not be regarded as limiting.

I. Overview

Sinks are used frequently in daily life in various environments, such as kitchens, bathrooms, laundry rooms, and the like. Depending on the intended use of the sink, it may be advantageous for the sink to provide illumination. For example, it may be desirable for the sink to illuminate its location within a room. In this way, the sink could be more easily located and navigated to by a user in low-light conditions, such as at night. Additionally, it may be desirable for the sink to provide ambient (e.g., mood, atmospheric, etc.) lighting. Such lighting may make a room within which the sink is located more aesthetically pleasing.

Implementations described herein are directed to sink systems that include a lighting system which is capable of providing illumination in a variety of ways that provide enhanced functional and/or aesthetic benefits compared to other sinks.

Implementations described herein may include apron lighting elements that illuminate an exterior surface of an apron attached to, and extending in front of, a basin. These apron lighting elements may be used to, for example, display a desired image or graphic on the exterior surface, and this desired image or graphic may be viewed by individuals within the room having the sink system.

Implementations described herein may also include floor lighting elements that illuminate a floor proximate the sink system. In addition to providing ambient light within a room having the sink system, the floor lighting elements may make navigating towards the sink easier for a user because the user is able to view the floor proximate the sink system.

Implementations described herein may also include drain lighting elements that illuminate a bottom wall of a basin around a drain. This illumination may make use of the sink easier (e.g., because the user can see items within the basin, etc.) and also provide an ambient glow (e.g., due to reflection of the light within the basin, etc.) that illuminates a space surrounding the sink system.

Implementations described herein may also include rim lighting units, each having at least one rim lighting element. The rim lighting units may be mounted under a counter and configured to illuminate a basin of the sink system. Similar to the drain lighting elements, the rim lighting elements may make use of the sink easier and provide an ambient glow that illuminates a space surrounding the sink system.

II. Example Sink System

FIG. 1 depicts an example sink system 100 (e.g., kitchen sink system, counter sink system, etc.). As is explained in more detail herein, the sink system 100 includes a lighting system that is configured to augment capabilities and functionalities of a traditional sink, such that the sink system 100 is more desirable than a traditional sink. The lighting system includes lighting elements that are selectively illuminated to provide specific capabilities and functions that are not provided by a traditional sink. The lighting elements are integrated (e.g., coupled to, integrally formed with, etc.) within various portions of the sink system 100. In this way, separate installation of lights and associated components, as would be required with a traditional sink, is avoided through use of the sink system 100.

The sink system 100 includes a basin 102. As is explained in more detail herein, the basin 102 is configured to receive water (e.g., hot water, cold water, potable water, cleaning water, etc.), facilitate use of the water within the basin 102, and provide the water from the basin 102 (e.g., to a sink drain conduit, etc.).

Figure 2:
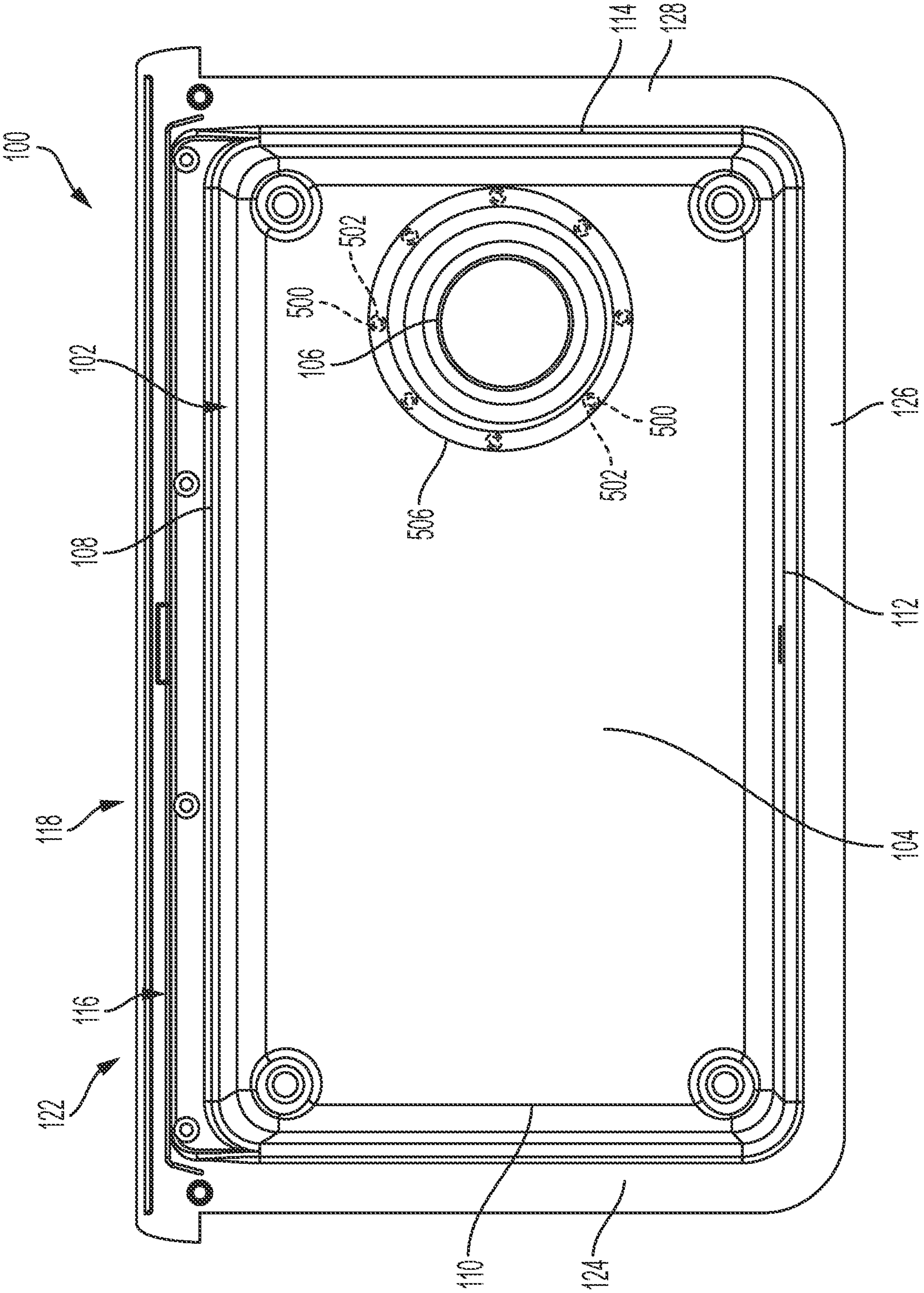
FIG. 2 is a bottom view of a basin for a sink system, according to an example embodiment.

As shown in FIG. 2, the basin 102 includes a bottom wall 104 that includes a drain 106 formed therein. As is explained in more detail herein, the basin 102 is configured to provide water from a faucet 107 (e.g., kitchen faucet, sink, etc.) to the drain 106, and the drain 106 is configured to pass water from the basin 102. The drain 106 is configured to be coupled to (e.g., attached to, joined with, integrally formed with, fastened to, threaded onto, threaded into, etc.) a sink drain conduit (e.g., pipe, fitting, disposal, drain pipe, etc.) and to provide water from the basin 102 to the sink drain conduit.

The basin 102 also includes a front wall 108. The front wall 108 is contiguous with (e.g., connected to, shares a border with, extending from, etc.) the bottom wall 104. The basin 102 also includes a first side wall 110. The first side wall 110 is contiguous with the bottom wall 104 and the front wall 108. In some embodiments, the front wall 108 and the first side wall 110 are approximately (e.g., within 5% of, etc.) orthogonal.

The basin 102 also includes a rear wall 112. The rear wall 112 is contiguous with the bottom wall 104 and the first side wall 110. In some embodiments, the front wall 108 and the rear wall 112 are approximately parallel. The basin 102 also includes a second side wall 114. The second side wall 114 is contiguous with the bottom wall 104, the front wall 108, and the rear wall 112. In some embodiments, the front wall 108 and the second side wall 114 are approximately orthogonal. In some embodiments, the rear wall 112 and the second side wall 114 are approximately orthogonal. In various embodiments, the front wall 108, the first side wall 110, the rear wall 112, and the second side wall 114 generally define (e.g., are disposed along edges of, etc.) a rectangle or a square.

Figure 3:
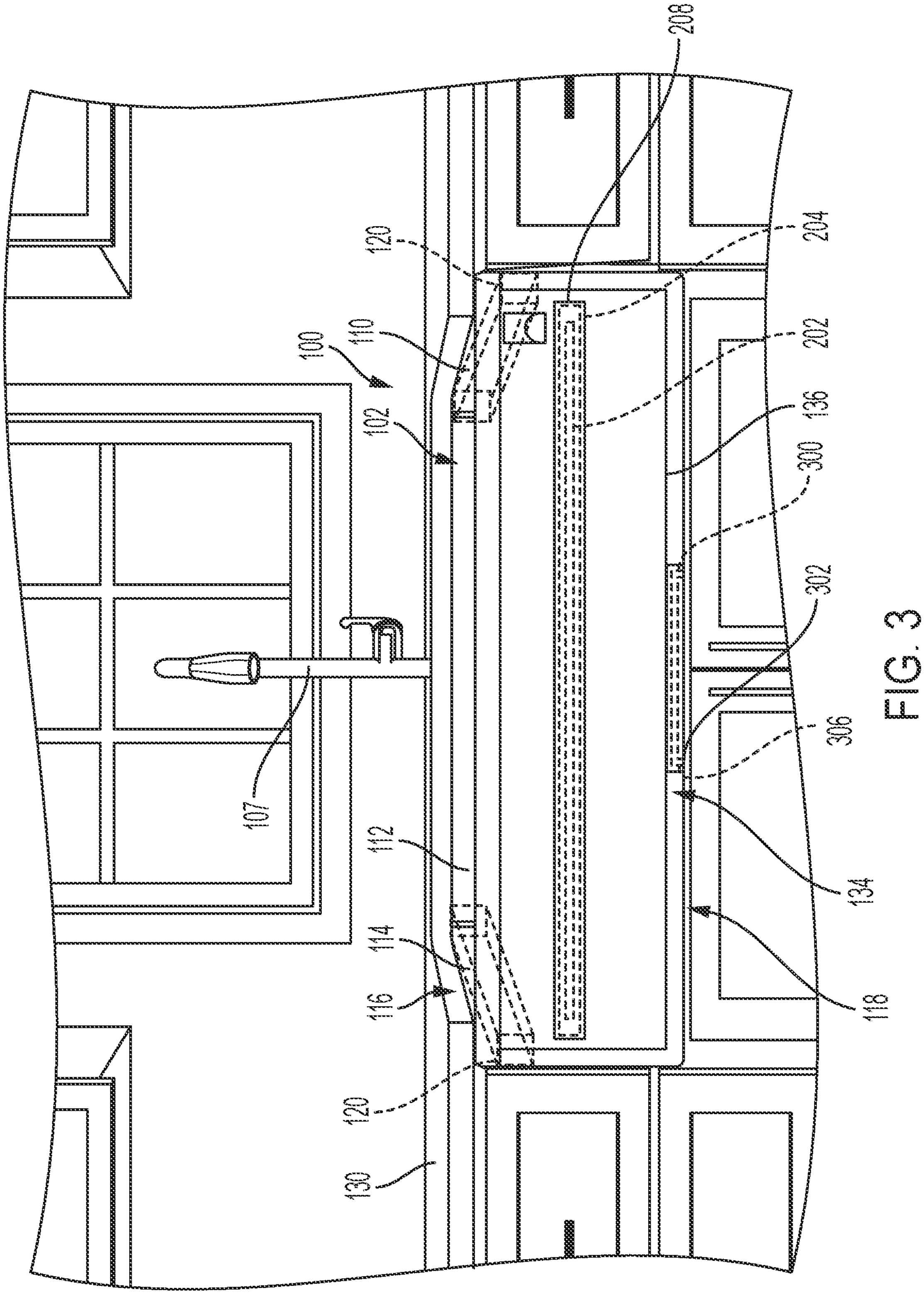
FIG. 3 is a front view of a sink system installed in a counter structure, according to an example embodiment.

The basin 102 also includes a basin rim 116. As is explained in more detail herein, the basin rim 116 facilitates attachment of the basin 102 to an apron 118 (e.g., skirt, panel, etc.) and support of the basin 102 on a counter structure 120 (e.g., support, beam, chassis, etc.), as shown in FIG. 3. The apron 118 is in confronting relation (e.g., disposed adjacent to, etc.) the front wall 108.

The basin rim 116 includes a rim front side 122. The rim front side 122 is contiguous with the front wall 108 and extends (e.g., projects, protrudes, etc.) from the front wall 108 away from the rear wall 112. In various embodiments, the rim front side 122 is coupled to the apron 118. In some embodiments, the rim front side 122 interfaces with the counter structure 120 (e.g., on a beam of the counter structure 120, etc.).

The basin rim 116 also includes a rim first side 124. The rim first side 124 is contiguous with the first side wall 110 and the rim front side 122. The rim first side 124 extends from the first side wall 110 away from the second side wall 114. In some embodiments, the rim first side 124 interfaces with the counter structure 120 (e.g., on a beam of the counter structure 120, etc.).

The basin rim 116 also includes a rim rear side 126. The rim rear side 126 is contiguous with the rear wall 112 and the rim first side 124 and extends from the rear wall 112 away from the front wall 108. In various embodiments, the rim rear side 126 is not coupled to the apron 118. In some embodiments, the rim rear side 126 interfaces with the counter structure 120 (e.g., on a beam of the counter structure 120, etc.).

The basin rim 116 also includes a rim second side 128. The rim second side 128 is contiguous with the second side wall 114, the rim rear side 126, and the rim front side 122. The rim second side 128 extends from the second side wall 114 away from the first side wall 110. In some embodiments, the rim second side 128 interfaces with the counter structure 120 (e.g., on a beam of the counter structure 120, etc.).

In some embodiments, at least a portion of the rim front side 122, at least a portion of the rim first side 124, at least a portion of the rim rear side 126, and at least a portion of the rim second side 128 are disposed along the same plane. In this way, the basin rim 116 may be positioned at a uniform distance from a counter 130 (e.g., countertop, etc.) of the counter structure 120.

The counter 130 is located above the counter structure 120. In some embodiments, an edge of the counter 130 extends over the rim first side 124, the rim rear side 126, and the rim second side 128. In these embodiments, the rim first side 124, the rim rear side 126, and the rim second side 128 are covered (e.g., concealed, overlapped, etc.) by the counter 130.

The apron 118 includes an apron coupling wall 132. The apron coupling wall 132 is configured to be coupled to the rim front side 122 such that the apron 118 is coupled to the basin 102. For example, the apron coupling wall 132 may be coupled to the rim front side 122 using threaded inserts (e.g., embedded in the rim front side 122, etc.), fasteners (e.g., extending between the rim front side 122 and the apron coupling wall 132, etc.), and nuts (e.g., located underneath the apron coupling wall 132, etc.).

Figure 4:
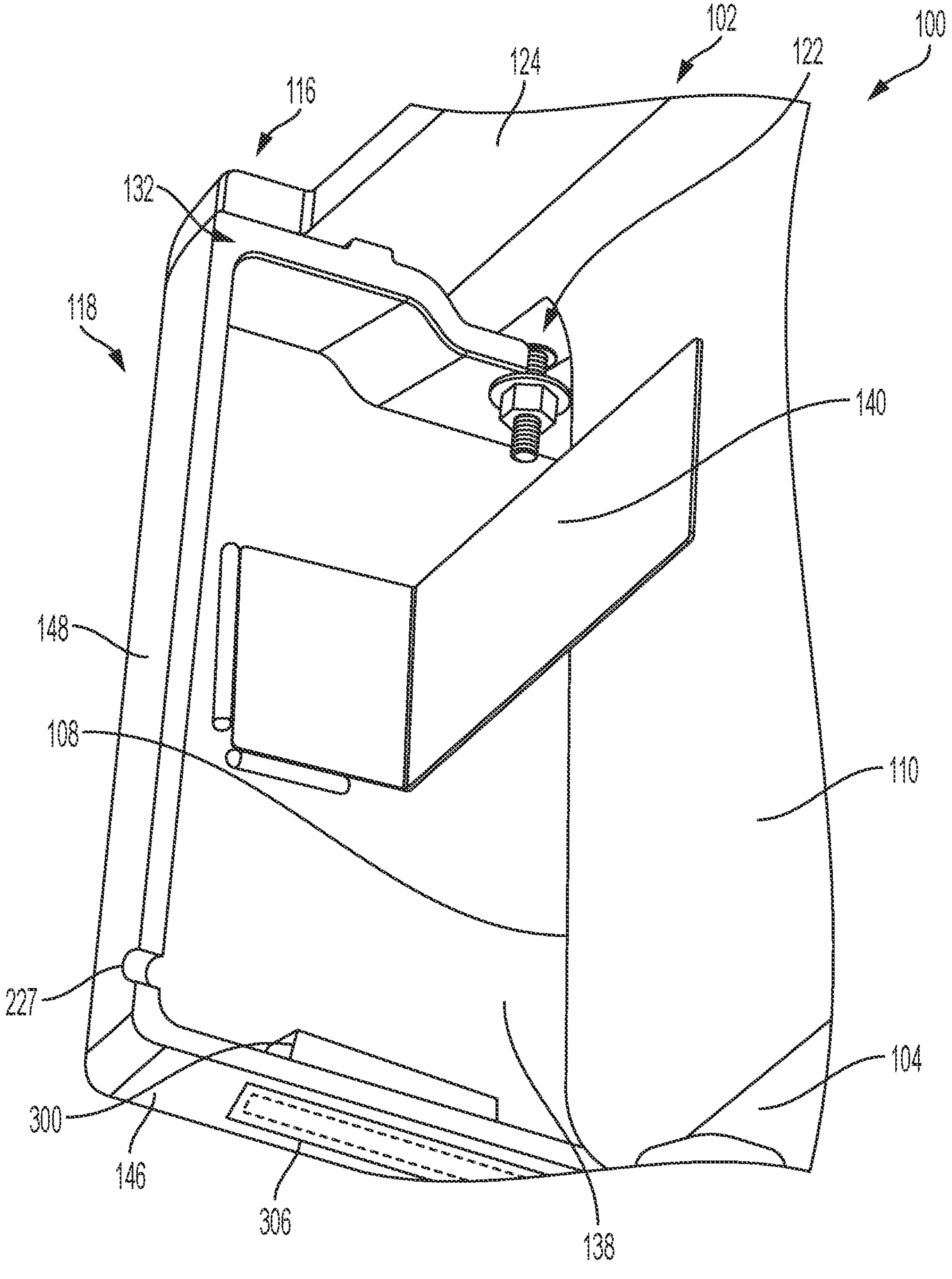
FIG. 4 is a rear perspective view of a portion of a sink system, according to an example embodiment.
Figure 5:
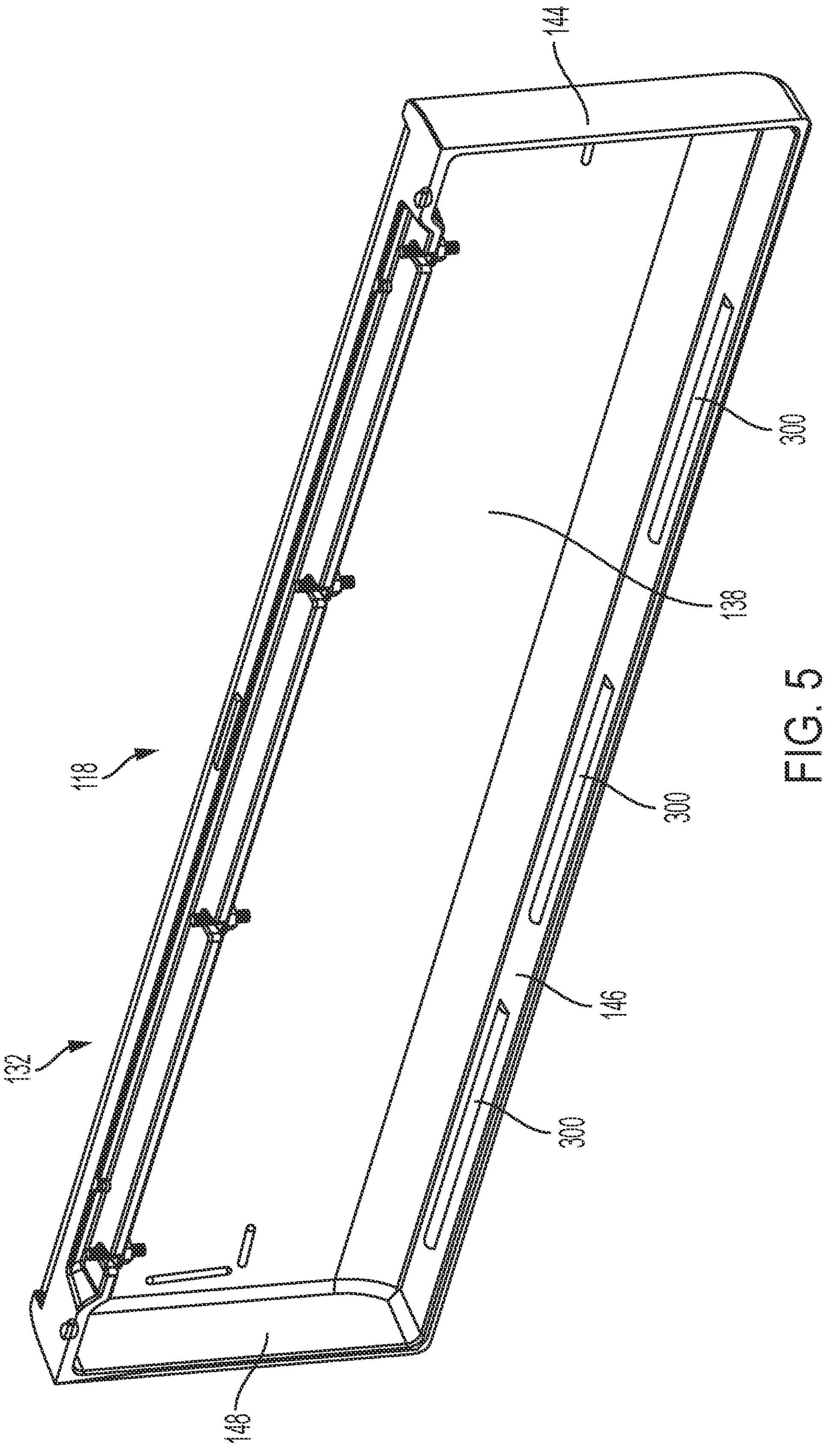
FIG. 5 is a rear perspective view of an apron a sink system, according to an example embodiment.
Figure 6:
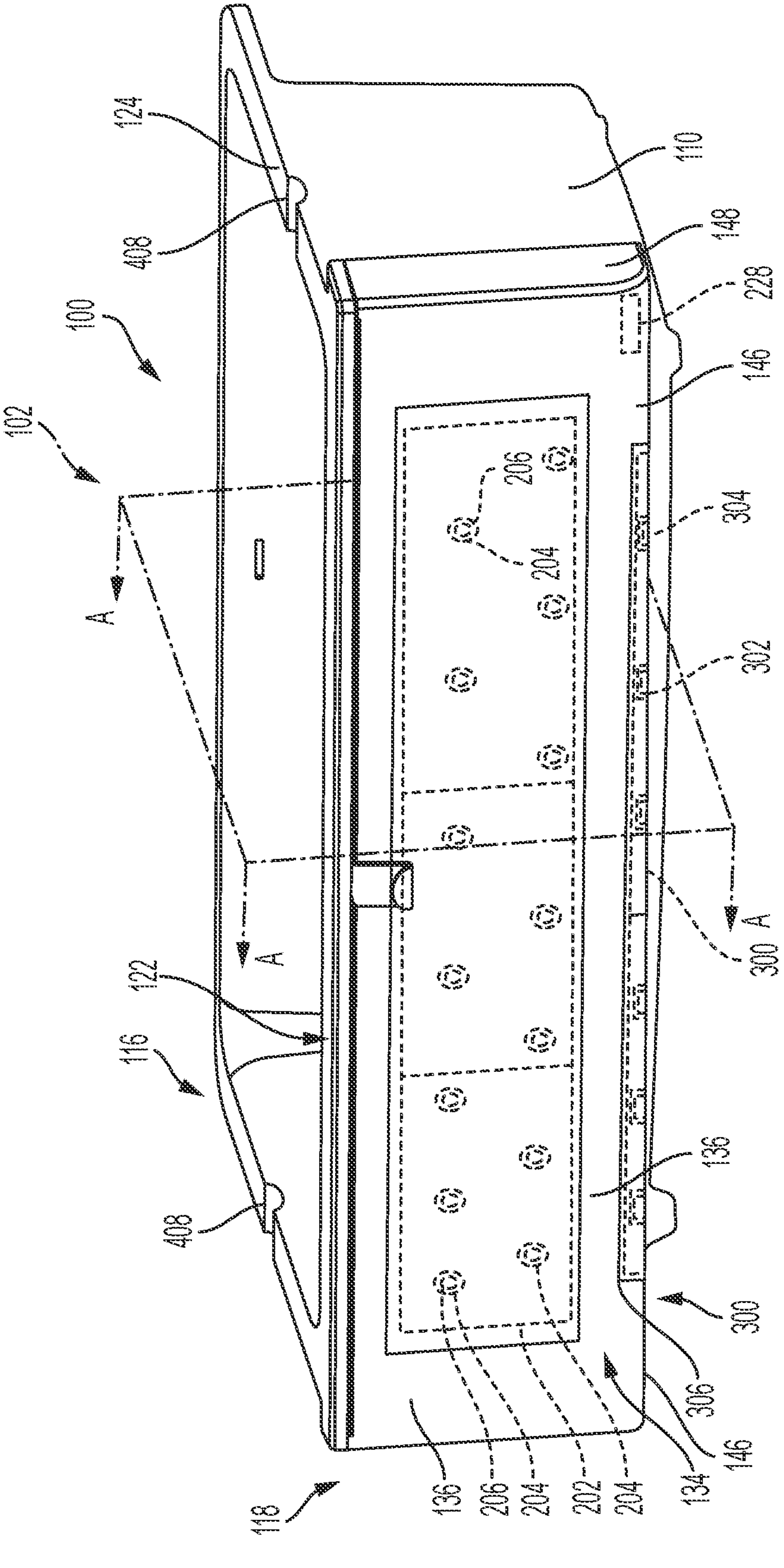
FIG. 6 is a front perspective view of a sink system, according to an example embodiment.
Figure 7:
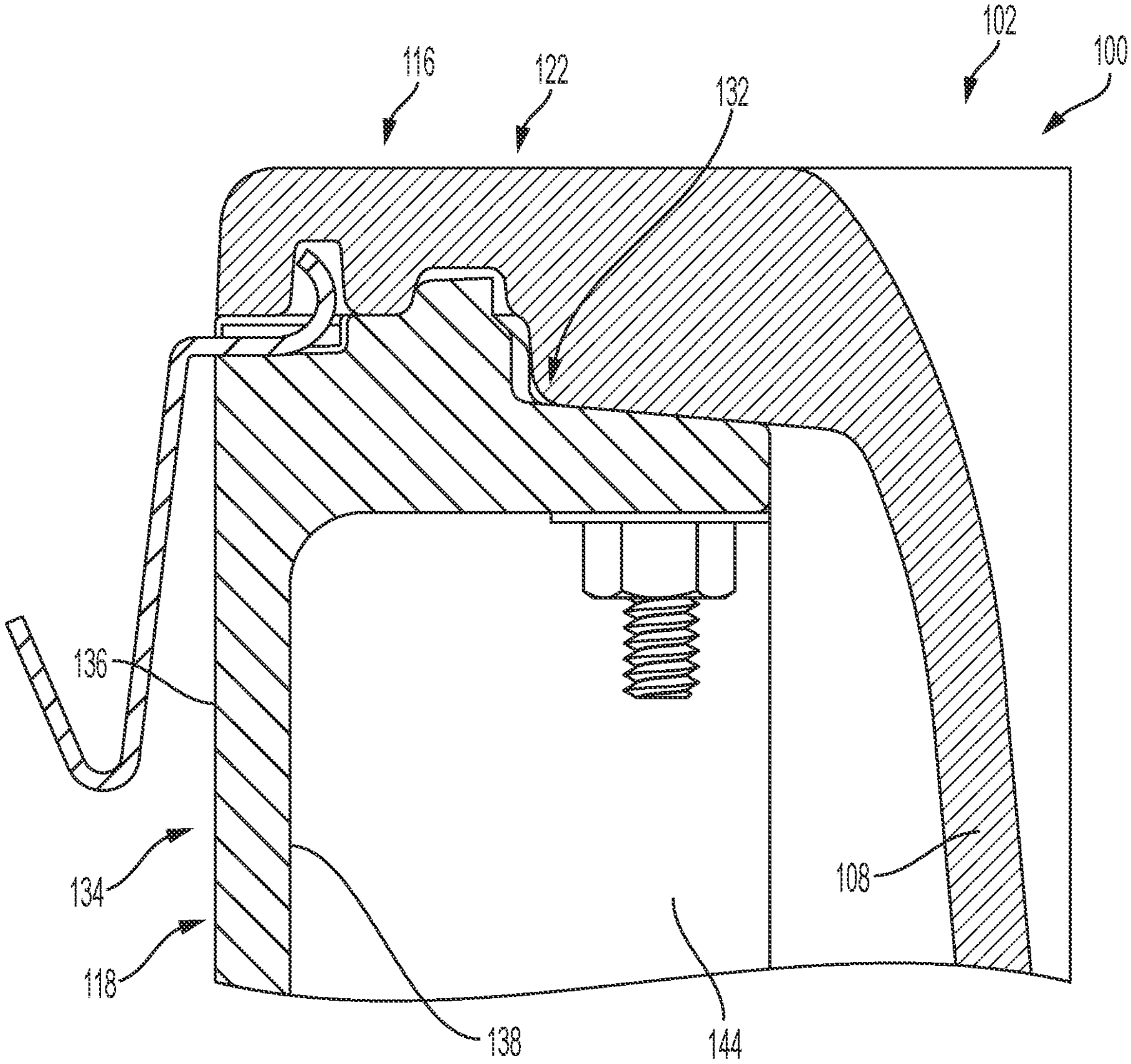
FIG. 7 is a cross-sectional view of the sink system shown in FIG. 6 taken along plane A-A.

The apron 118 also includes an apron panel wall 134. The apron panel wall 134 is contiguous with the apron coupling wall 132. The apron panel wall 134 extends from the apron coupling wall 132 away from the rim front side 122. The apron panel wall 134 defines an exterior surface 136 (e.g., face, etc.) and an interior surface 138 (e.g., face, etc.), as shown in FIGS. 3-5.

The exterior surface 136 has a target aesthetic appearance. For example, the exterior surface 136 may be textured, polished, and/or contain a design or image. In this way, the exterior surface 136 may provide a desired aesthetic benefit to a room within which the sink system 100 is installed. In some embodiments, the sink system 100 is configured such that the apron 118 having an exterior surface 136 with a first target aesthetic appearance can be rapidly and easily interchanged with another apron 118 having an exterior surface 136 with a second target aesthetic appearance, while utilizing the same basin 102 and the same other components of the sink system 100. Additionally, the basin 102 can remain supported by the counter structure 120 while the apron 118 is uncoupled from the basin 102, and a new apron 118 is coupled to the basin 102. In this way, a user can rapidly and easily provide a desired aesthetic benefit to a room within which the sink system 100 is installed (e.g., when remodeling a room, etc.).

In various embodiments, the sink system 100 also includes a first coupling bracket 140 and a second coupling bracket 142. As shown in FIG. 4, the first coupling bracket 140 is coupled to the first side wall 110 and the interior surface 138. Similarly, the second coupling bracket 142 is coupled to the second side wall 114 and the interior surface 138. Collectively, the first coupling bracket 140 and the second coupling bracket 142 aid in securing the apron 118 to the basin 102. In some embodiments, the sink system 100 does not include the first coupling bracket 140 and/or the second coupling bracket 142.

The apron 118 also includes a first connector wall 144. The first connector wall 144 is contiguous with the apron coupling wall 132 and the apron panel wall 134. The first connector wall 144 extends from the apron coupling wall 132 away from the rim front side 122 and from the apron panel wall 134 towards the front wall 108.

The apron 118 also includes an apron spanning wall 146. The apron spanning wall 146 is contiguous with the apron panel wall 134 and the first connector wall 144. The apron spanning wall 146 extends from the apron panel wall 134 towards the front wall 108 and from the first connector wall 144 away from the second side wall 114.

The apron 118 also includes a second connector wall 148. The second connector wall 148 is contiguous with the apron coupling wall 132, the apron panel wall 134, and the apron spanning wall 146. The second connector wall 148 extends from the apron coupling wall 132 away from the rim front side 122 and from the apron panel wall 134 towards the front wall 108.

III. Example Lighting System

The sink system 100 also includes a lighting system 200 (e.g., illumination system, light system, etc.). As is explained in more detail herein, the lighting system 200 is configured to selectively provide illumination (e.g., lighting, light, etc.) to one or more illumination targets (e.g., lighting targets, light targets, etc.) while being at least partially integrated within (e.g., integrally formed with, embedded, etc.) the basin 102 and/or the apron 118. In this way, the sink system 100 provides illumination of the illumination targets without requiring extensive installation and assembly of auxiliary components to illuminate the illumination targets.

The lighting system 200 includes at least one apron lighting element 202 (e.g., light source, illumination element, illumination source, etc.). The apron lighting elements 202 are configured to illuminate the exterior surface 136 of the apron panel wall 134. Each of the apron lighting elements 202 provides illumination to at least one apron illumination target 204 disposed on the exterior surface 136. In other words, a portion (e.g., the apron illumination target 204, etc.) of the exterior surface 136 is illuminated by the lighting system 200.

The lighting system 200 may include any number of apron lighting elements 202 and any number of apron illumination targets 204. For example, the lighting system 200 may include one, two, five, ten, twenty, fifty, or one-hundred of the apron lighting elements 202 and/or of the apron illumination targets 204. In FIG. 1, for example, the lighting system 200 includes three of the apron lighting elements 202 and fourteen of the apron illumination targets 204. In FIG. 3, for example, the lighting system 200 includes one apron lighting element 202 and one apron illumination target 204.

The apron 118 and the apron lighting elements 202 cooperate to provide the illumination from the apron lighting elements 202 to the apron illumination targets 204. In various embodiments, such as is shown in FIG. 1, the apron 118 includes a plurality of apron apertures 206 (e.g., bores, holes, etc.). Each of the apron apertures 206 provides an illumination path (e.g., by forming a light pipe, etc.) for light to travel from at least one of the apron lighting elements 202 to at least one of the apron lighting elements 202. In some embodiments, the apron apertures 206 are formed in the apron 118 via a mold or via machining (e.g., post-molding machining, etc.). In other embodiments, the apron apertures 206 are formed via fiber optic conduits that are embedded as the apron 118 is formed. For example, the fiber optic conduits may be suspended within a mold and material (e.g., liquid resin, liquid epoxy, liquid plastic, etc.) may be poured into the mold around the fiber optic conduits. When the material solidifies and the apron 118 is formed, the fiber optic conduits are embedded.

In various embodiments, such as is shown in FIG. 1, the lighting system 200 also includes at least one apron lighting element cover 208 (e.g., lens, cap, etc.). Each of the apron apertures 206 is covered (e.g., overlapped, sealed, etc.) by one of the apron lighting element covers 208. In this way, ingress of fluid (e.g., water, etc.) through the apron apertures 206 towards the apron lighting elements 202 is substantially prohibited. Each of the apron illumination targets 204 may be on one of the apron lighting element covers 208. The apron lighting element covers 208 may be initially separate from the apron 118 and coupled to the exterior surface 136 (e.g., via an adhesive, etc.). Additionally, the apron lighting element cover 208 may be a translucent and/or transparent portion of the apron 118. For example, the apron 118 may be at least partially constructed from an at least partially translucent and/or transparent material (e.g., epoxy, resin, plastic, polycarbonate, glass, etc.) which forms the apron lighting element covers 208 such that the apron apertures 206 terminate at the apron lighting element covers 208, and the translucent and/or transparent material of the apron lighting element covers 208 conveys the light from the apron apertures 206 to the apron illumination targets 204. In one example, the apron 118 includes a translucent and/or transparent material that forms a single apron lighting element cover 208 and the apron illumination targets 204 are all disposed on the apron lighting element cover 208. In some embodiments where the apron 118 includes a translucent and/or transparent material that forms the apron lighting element covers 208, the apron 118 does not include the apron apertures 206 (e.g., the apron lighting elements 202 are encapsulated within the apron 118, etc.).

The illumination provided by the apron lighting elements 202 may make the sink system 100 more desirable because the apron 118 can provide specific aesthetic and functional benefits. Aesthetically, the apron illumination targets 204 may provide an aesthetic appearance that is different from, or complimentary to, the aesthetic appearance of the exterior surface 136. For example, the apron illumination targets 204 may be arranged in a specific pattern, shape, or arrangement, such that illumination of the apron illumination targets 204 displays the specific pattern, shape, or arrangement, and such that this specific pattern, shape, or arrangement is not displayed when the apron illumination targets 204 are not illuminated.

Figure 8:
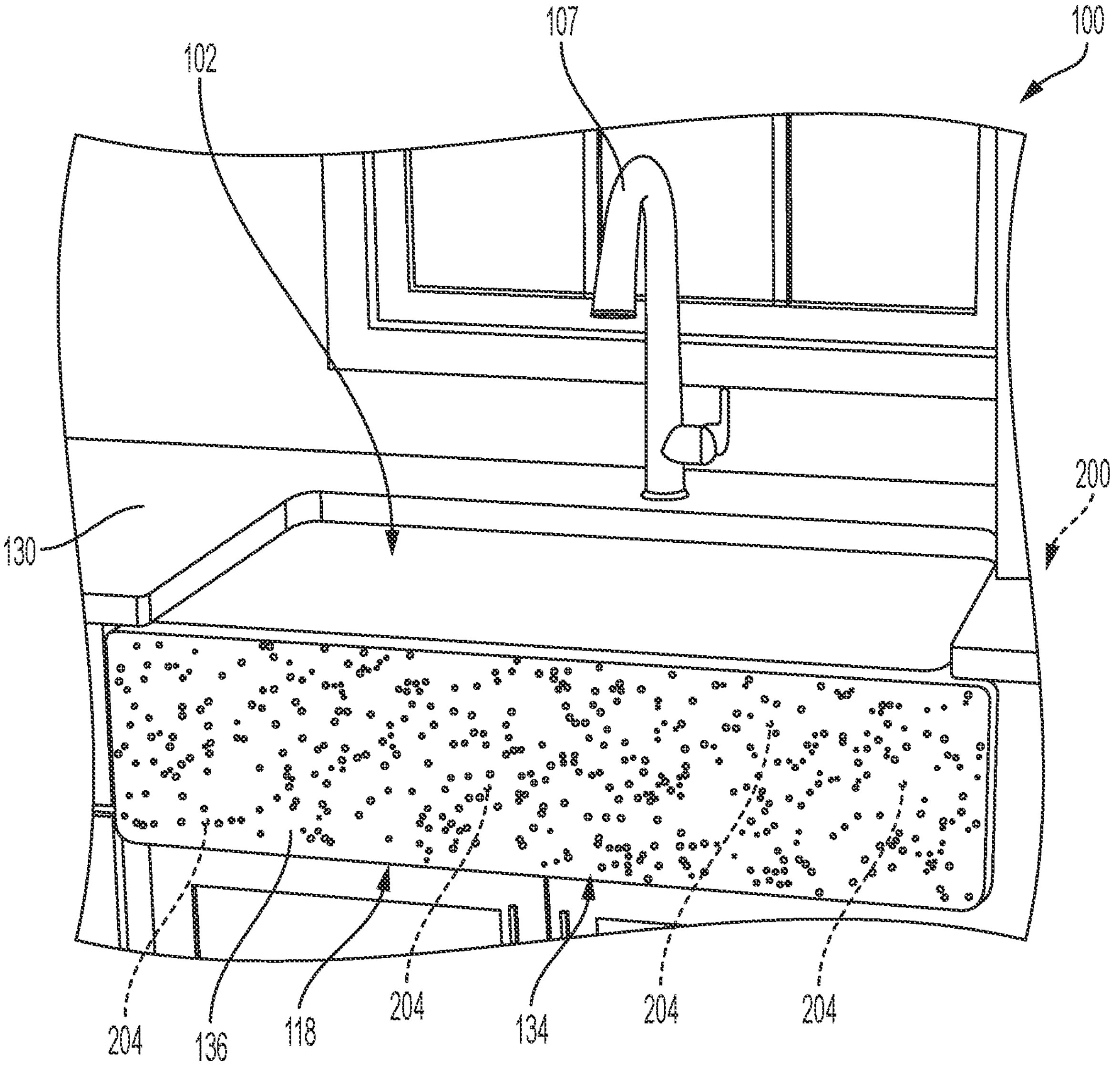
FIG. 8 is a front view of another sink system installed in a counter structure, according to an example embodiment.

One example of such a specific pattern, shape, or arrangement is a star field, as shown in FIG. 8. In this arrangement, each individual 'star' within the star field is one of the apron illumination targets 204. The apron apertures 206 may be fiber optic conduits embedded within the apron 118 and extending from the apron lighting elements 202 to the apron illumination targets 204. The apron lighting element covers 208 may be a translucent and/or transparent portion of the apron 118 that encapsulates terminal ends of the fiber optic conduits that form the apron apertures 206.

In other examples, the specific pattern, shape, or arrangement of the apron illumination targets 204 may be configured to convey information. For example, the apron illumination targets 204 may be arranged so as to form one or a series of letters or numbers when illuminated. As a result, the lighting system 200 may utilize the apron illumination targets 204 to convey information such as time, temperature of water flowing through the faucet 107, ambient temperature (e.g., of the air surrounding the basin 102, etc.), or other similar information.

Figure 9:
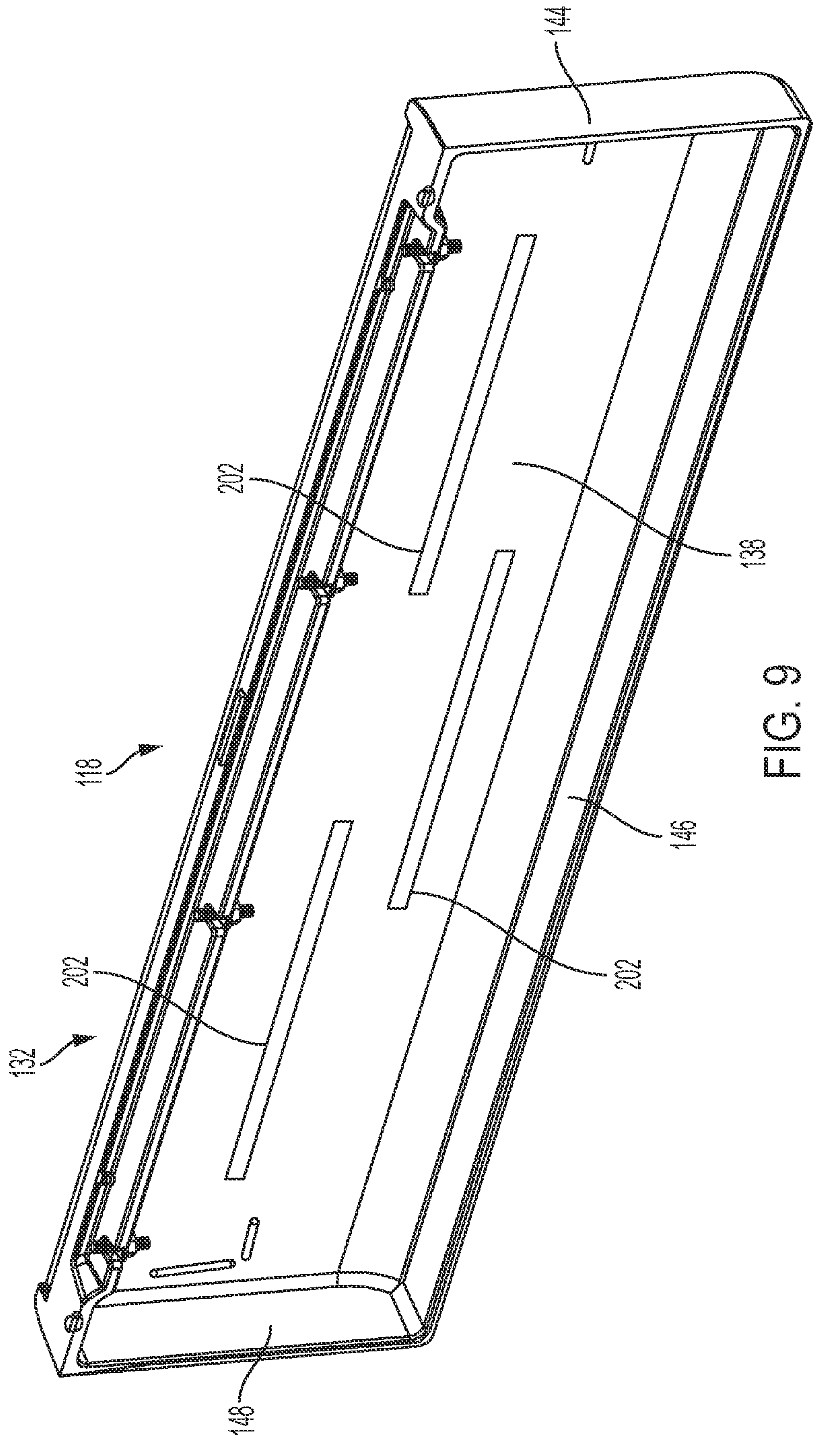
FIG. 9 is a rear perspective view of another apron for a sink system, according to an example embodiment.

As shown in FIG. 9, the lighting system 200 may be configured with the apron lighting elements 202 being strips (e.g., light emitting diode (LED) strips, electroluminescent (EL) strips, etc.) that are applied to the interior surface 138. In these embodiments, the apron lighting elements 202 are applied over the apron apertures 206 or the apron 118 includes a translucent and/or transparent material that forms the apron lighting element covers 208 and the apron 118 does not include the apron apertures 206. In some embodiments, the apron lighting elements 202 may be coupled to the front wall 108 of the basin 102 instead of, or in addition to, being coupled to the apron 118.

In some embodiments, the lighting system 200 includes a plurality of apron lighting elements 202, each configured to illuminate their own apron illumination target 204, such that the number of the apron lighting elements 202 is equal to the number of the apron illumination targets 204.

In some embodiments, any or all of the apron lighting elements 202 are configured to illuminate a plurality of the apron illumination targets 204. For example, a first of the apron lighting elements 202 is configured to illuminate a first of the apron illumination targets 204 and a second of the apron lighting elements 202 is configured to illuminate two or more of the apron illumination targets 204 different from the first of the apron illumination targets 204. In some embodiments, two of the apron lighting elements 202 may be configured to illuminate the same apron illumination target 204.

Figure 10:
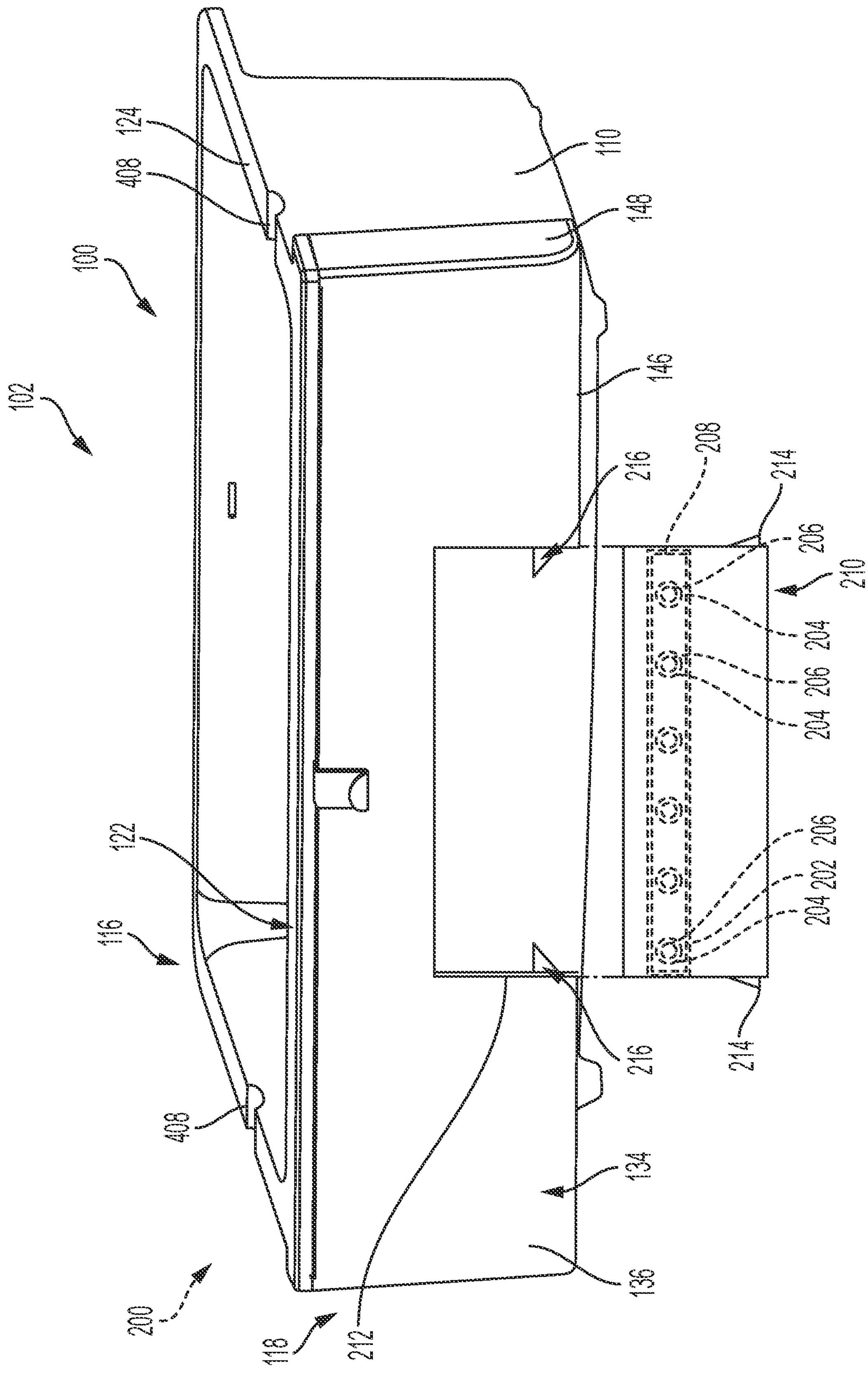
FIG. 10 is a front perspective view of yet another sink system, according to an example embodiment.

As shown in FIG. 10, the sink system 100 further includes an apron section 210 (e.g., apron modular section, etc.). The sink system 100 also includes an apron receptacle 212 (e.g., apron receiver, slot, opening, window, channel, etc.). The apron receptacle 212 is formed in the apron 118. The apron section 210 is configured to be received within the apron receptacle 212. In these embodiments, the apron lighting elements 202, the apron illumination target 204, the apron apertures 206, and the apron lighting element covers 208 are included within the apron section 210. For example, the apron lighting elements 202, the apron illumination target 204, the apron apertures 206, and the apron lighting element covers 208 may be included within the apron section 210 only and are not included within the apron 118.

The apron section 210 is configured to be selectively coupled to, and decoupled from, the apron receptacle 212. For example, the apron section 210 may be inserted into the apron receptacle 212 from the rear (e.g., via a translation along a direction from the interior surface 138 towards the exterior surface 136, etc.). In this way, one apron section 210 may be removed and replaced with another apron section 210. As a result, the aesthetic appearance of the apron 118 may be rapidly and easily adjusted. In another example, one apron section 210 without the apron lighting elements 202, the apron illumination target 204, the apron apertures 206, and the apron lighting element covers 208 may be replaced with another apron section 210 including the apron lighting elements 202, the apron illumination target 204, the apron apertures 206, and the apron lighting element covers 208. As a result, capabilities of the sink system 100 may be rapidly and easily adjusted.

In various embodiments, the apron section 210 includes apron section retainers 214 (e.g., clips, connectors, etc.) and the apron 118 includes apron receptacle retainers 216 (e.g., clips, connectors, etc.). The apron section retainers 214 and the apron receptacle retainers 216 cooperate to facilitate coupling and decoupling of the apron section 210 and the apron receptacle 212. The apron section retainers 214 and the apron receptacle retainers 216 may be, for example, spring-loaded and/or mat utilize ball detents.

Each or all of the apron lighting elements 202 may be an LED (e.g., an organic LED (OLED), high intensity LED, LED strip, LED rope, etc.), a bulb, an EL strip (e.g., EL ribbon, etc.), or other type lighting elements. The apron lighting elements 202 may be configured to be illuminated as a single color (e.g., red, green, blue, white, yellow, purple, etc.) or multiple colors (e.g., red/green/blue, etc.).

The lighting system 200 includes a controller 217 (e.g., control unit, etc.). The controller 217 is in electronic communication with the apron lighting elements 202 (e.g., via a wired connection, via a wireless connection, etc.). The controller 217 includes a processing circuit 218. The processing circuit 218 includes a processor 220 and a memory 222. The processor 220 may include a microprocessor, an application-specific integrated circuit (ASIC), a field-programmable gate array (FPGA), etc., or combinations thereof. The memory 222 may include, but is not limited to, electronic, optical, magnetic, or any other storage or transmission device capable of providing a processor, ASIC, FPGA, etc. with program instructions. This memory 222 may include a memory chip, Electrically Erasable Programmable Read-Only Memory (EEPROM), Erasable Programmable Read Only Memory (EPROM), flash memory, or any other suitable memory from which the controller 217 can read instructions. The instructions may include code from any suitable programming language. The memory 222 may include various modules that include instructions which are configured to be implemented by the processor 220.

The memory 222 includes various modules which are capable of being implemented by the processor 220 to cause various processes to take place. In various embodiments, the memory 222 includes an apron module 224.

The apron module 224 is configured to control operation of the apron lighting elements 202. For example, the apron module 224 may be configured to cause individual ones, or all, of the apron lighting elements 202 to illuminate individual ones, or all, of the apron illumination targets 204. In various embodiments, the apron module 224 may be configured to control operation of the apron lighting elements 202 to convey information such as time, temperature of water flowing through the faucet 107, ambient temperature (e.g., of the air surrounding the basin 102, etc.), or other similar information. In some of these embodiments, the apron module 224 may be in electronic communication with other controllers or sensors (e.g., a temperature sensor, etc.) and utilize information from these other controllers or sensors to control operation of the apron lighting elements 202.

The controller 217 is in electronic communication with a power source 226 (e.g., power supply, etc.). In some embodiments, the power source 226 is a battery (e.g., a rechargeable battery, etc.). In some embodiments, the power source 226 is an electrical grid (e.g., home electrical grid, kitchen electrical grid, etc.). In some of these embodiments, the controller 217 may be connected to the electrical grid via a cord with a plug that can be connected to a wall socket. Where a cord is utilized, an apron slot 227 (e.g., cut-out, etc.) may be included in the apron 118 for routing of the cord through the apron 118. As shown in FIG. 4, the apron slot 227 may be disposed in the second connector wall 148. However, the apron slot 227 may, additionally or alternatively, be disposed in the apron coupling wall 132, the apron spanning wall 146, and/or the first connector wall 144.

In some embodiments, the lighting system 200 includes a sensor 228 (e.g., light sensor, motion sensor, proximity sensor, infrared sensor, radiofrequency sensor, occupancy sensor, temperature sensor, etc.). The controller 217 is in electronic communication with the power source 226 and is configured to provide a signal to the controller 217 after receiving (e.g., in response to receiving, etc.) a trigger (e.g., change in light proximate the sink system 100, detection of motion past the apron 118, etc.). The controller 217 may be configured to control operation of the apron lighting elements 202 in response to receiving the signal from the sensor 228. For example, as shown in FIG. 1, the sensor 228 may be incorporated into the apron 118 and configured to detect a change of light in front of the apron 118 or motion in front of the apron 118. In this example, the controller 217 may be configured to illuminate one or all of the apron lighting elements 202 in response to detecting the change in light (e.g., the light proximate the apron drops below a threshold and the apron lighting elements 202 are desired as a 'night light,' etc.) or the detected motion.

In various embodiments, the memory 222 also includes a timer module 230. The timer module 230 is configured to control operation of the apron lighting elements 202 (e.g., independent of the apron module 224, in conjunction with the apron module 224, etc.). For example, the timer module 230 may be configured to cause individual ones, or all, of the apron lighting elements 202 to illuminate individual ones, or all, of the apron illumination targets 204 in response to a time counter exceeding a time counter threshold. The time counter may be reset by the timer module 230 in response to an event, such as a motion detected by the sensor 228 or a change in light detected by the sensor 228.

The lighting system 200 may also include a button 232 (e.g., remote, switch, smartphone application, etc.). The button 232 is in electronic communication with the controller 217 and is configured to control operation of the apron lighting elements 202. For example, the button 232 may be configured to cause individual ones, or all, of the apron lighting elements 202 to illuminate individual ones, or all, of the apron illumination targets 204. Additionally, the button 232 may be configured to cooperate with the apron module 224 to utilize the apron lighting elements 202 to convey information.

The lighting system 200 also includes at least one floor lighting element 300 (e.g., light source, illumination element, illumination source, etc.), according to an example embodiment. The lighting system 200 may include only the floor lighting elements 300 (e.g., and not include any of the apron lighting elements 202, etc.), only the apron lighting elements 202 (e.g., and not include any of the floor lighting elements 300, etc.), or include at least one of the apron lighting elements 202 and at least one of the floor lighting elements 300, according to various example embodiments.

The floor lighting elements 300 are configured to illuminate the apron spanning wall 146 and/or exterior surface 136 of the apron panel wall 134, so that light can be provided towards a floor above which the sink system 100 is installed. In this way, the floor lighting elements 300 may assist a user in using the sink system 100 (e.g., at night, etc.) and/or may provide an aesthetically pleasing and unobtrusive ambient lighting in a room (e.g., kitchen, etc.) where the sink system 100 is installed. Each of the floor lighting elements 300 provides illumination to at least one floor illumination target 302 disposed on the apron spanning wall 146 and/or the exterior surface 136. In other words, a portion (e.g., the floor illumination target 302, etc.) of the apron spanning wall 146 and/or the exterior surface 136 is illuminated by the lighting system 200.

The lighting system 200 may include any number of the floor lighting elements 300 and any number of the floor illumination targets 302. For example, the lighting system 200 may include one, two, five, ten, twenty, fifty, or one-hundred of the floor lighting elements 300 and/or of the floor illumination targets 302. In FIG. 1, for example, the lighting system 200 includes two of the floor lighting elements 300 and six of the floor illumination targets 302. In FIG. 3, for example, the lighting system 200 includes one floor lighting element 300 and one floor illumination target 302.

The apron 118 and the floor lighting elements 300 cooperate to provide the illumination from the floor lighting elements 300 to the floor illumination targets 302. In various embodiments, such as is shown in FIG. 1, the apron 118 includes a plurality of floor illumination apertures 304 (e.g., bores, holes, etc.). Each of the floor illumination apertures 304 provides an avenue (e.g., by forming a light pipe, etc.) for light to travel from at least one of the floor lighting elements 300 to at least one of the floor illumination targets 302. In some embodiments, the floor illumination apertures 304 are formed in the apron 118 (e.g., in the apron spanning wall 146, etc.) via a mold or via machining (e.g., post-molding machining, etc.). In other embodiments, the floor illumination apertures 304 are formed via fiber optic conduits that are embedded as the apron 118 (e.g., the apron spanning wall 146, etc.) is formed.

In various embodiments, such as the embodiment shown in FIG. 1, the lighting system 200 also includes at least one floor lighting element cover 306 (e.g., lens, cap, etc.). Each of the floor illumination apertures 304 is covered (e.g., overlapped, sealed, etc.) by one of the floor lighting element covers 306. In this way, ingress of fluid (e.g., water, etc.) through the floor illumination apertures 304 towards the floor lighting elements 300 is substantially prohibited. Each of the floor illumination targets 302 may be on one of the floor lighting element covers 306. The floor lighting element covers 306 may be initially separate from the apron 118 and coupled to the exterior surface 136 and/or the apron spanning wall 146 (e.g., via an adhesive, etc.). Additionally, the floor lighting element cover 306 may be a translucent and/or transparent portion of the apron 118 (e.g., of the apron spanning wall 146, etc.). For example, the apron spanning wall 146 may be at least partially constructed from a translucent and/or transparent material which forms the floor lighting element covers 306 such that the floor illumination apertures 304 terminate at the floor lighting element covers 306, and the translucent and/or transparent material of the floor lighting element covers 306 conveys the light from the floor illumination apertures 304 to the floor illumination targets 302. In one example, the apron spanning wall 146 includes a translucent and/or transparent material that forms a single floor lighting element cover 306 and the floor illumination targets 302 are all disposed on the floor lighting element cover 306. In some embodiments where the apron 118 includes a translucent and/or transparent material that forms the floor lighting element covers 306, the apron 118 does not include the floor illumination apertures 304 (e.g., the floor lighting elements 300 are encapsulated within the apron 118, etc.).

The illumination provided by the floor lighting elements 300 may make the sink system 100 more desirable because the apron 118 can provide specific aesthetic and functional benefits. Aesthetically, the floor illumination targets 302 may provide an ambient lighting (e.g., as a night light, etc.). Functionally, the floor illumination targets 302 may assist a user in approaching the apron 118 such that the sink system 100 can be utilized in low-lighting conditions (e.g., at night, etc.).

As shown in FIGS. 4 and 5, the lighting system 200 may be configured with the floor lighting elements 300 being strips that are applied to an interior surface of the apron spanning wall 146. In these embodiments, the floor lighting elements 300 are applied over the floor illumination apertures 304 or the apron spanning wall 146 includes a translucent and/or transparent material that forms the floor lighting element covers 306 and the apron spanning wall 146 does not include the floor illumination apertures 304. In some embodiments, the floor lighting elements 300 may be coupled to the front wall 108 of the basin 102 instead of, or in addition to, being coupled to the apron spanning wall 146. In some embodiments, the floor lighting elements 300 may be coupled to the exterior surface 136 instead of, or in addition to, being coupled to the apron spanning wall 146. In some embodiments, the floor lighting elements 300 may be coupled to the interior surface 138 instead of, or in addition to, being coupled to the apron spanning wall 146.

In some embodiments, the lighting system 200 includes a plurality of floor lighting elements 300, each configured to illuminate their own floor illumination target 302, such that the number of the floor lighting elements 300 is equal to the number of the floor illumination targets 302.

In some embodiments, any or all of the floor lighting elements 300 are configured to illuminate a plurality of the floor illumination targets 302. For example, a first of the floor lighting elements 300 is configured to illuminate a first of the floor illumination targets 302 and a second of the floor lighting elements 300 is configured to illuminate two or more of the floor illumination targets 302 different from the first of the floor illumination targets 302. In some embodiments, two of the floor lighting elements 300 may be configured to illuminate the same floor illumination target 302.

Figure 11:
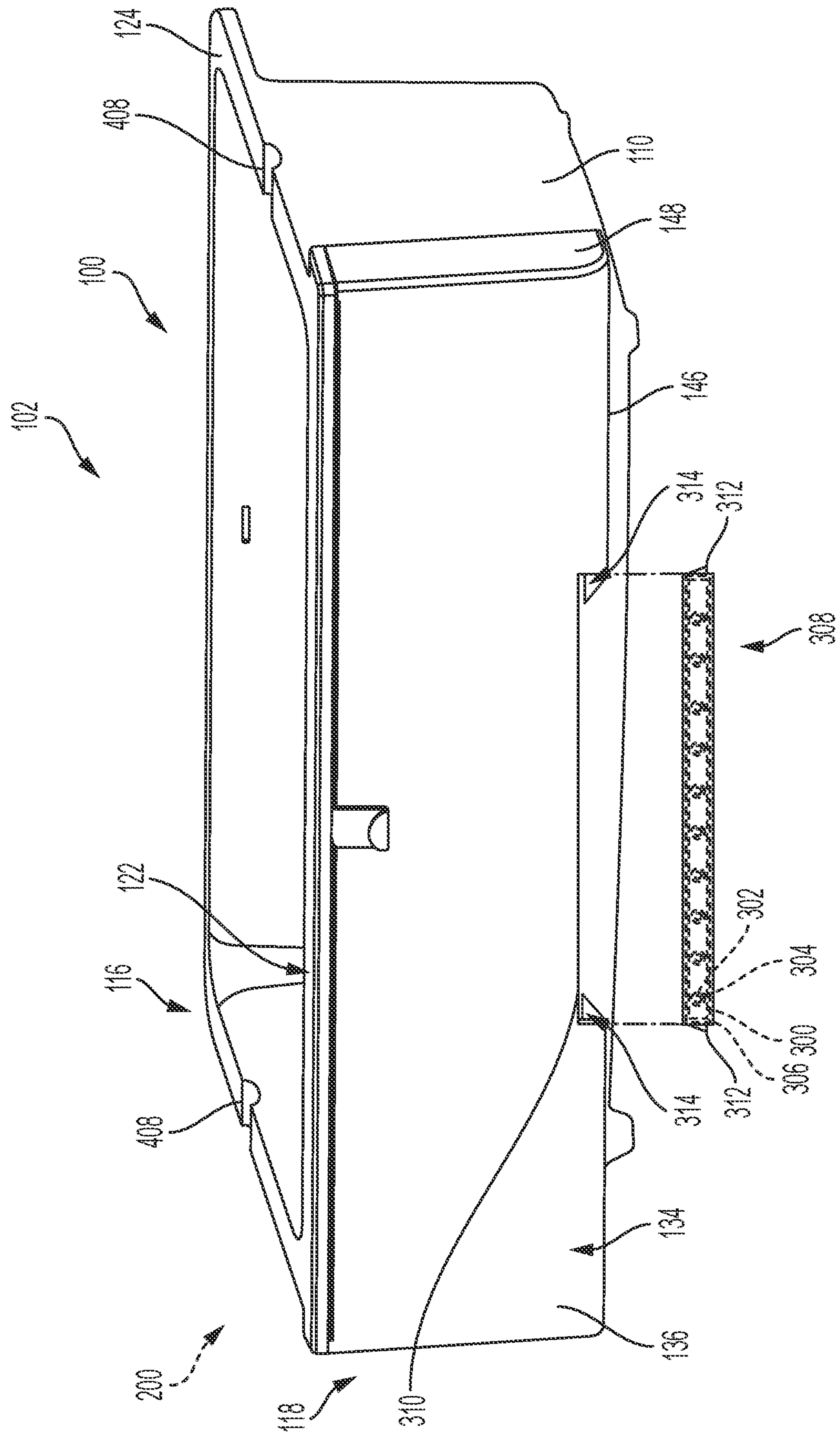
FIG. 11 is a front perspective view of yet another sink system, according to an example embodiment.

As shown in FIG. 11, the sink system 100 further includes a floor section 308 (e.g., apron modular section, etc.). The floor section 308 is configured to be received within an floor receptacle 310 (e.g., apron receiver, slot, opening, window, channel, etc.) formed in the apron 118. In these embodiments, the floor lighting elements 300, the floor illumination target 302, the floor illumination apertures 304, and the floor lighting element covers 306 are included within the floor section 308. For example, the floor lighting elements 300, the floor illumination target 302, the floor illumination apertures 304, and the floor lighting element covers 306 may be included within the floor section 308 only and are not included within the apron 118.

The floor section 308 is configured to be selectively coupled to, and decoupled from, the floor receptacle 310. For example, the floor receptacle 310 may be inserted into the floor receptacle 310 from the rear (e.g., via a translation along a direction from the interior surface 138 towards the exterior surface 136, etc.). In this way, one floor section 308 may be removed and replaced with another floor section 308. As a result, the aesthetic appearance of the apron 118 may be rapidly and easily adjusted. In another example, one floor section 308 without the floor lighting elements 300, the floor illumination target 302, the floor illumination apertures 304, and the floor lighting element covers 306 may be replaced with another floor section 308 including the floor lighting elements 300, the floor illumination target 302, the floor illumination apertures 304, and the floor lighting element covers 306. As a result, capabilities of the sink system 100 may be rapidly and easily adjusted.

In various embodiments, the floor section 308 includes floor section retainers 312 (e.g., clips, connectors, etc.) and the apron 118 includes floor receptacle retainers 314 (e.g., clips, connectors, etc.). The floor section retainers 312 and the floor receptacle retainers 314 cooperate to facilitate coupling and decoupling of the floor section 308 and the floor receptacle 310. The floor section retainers 312 and the floor receptacle retainers 314 may be, for example, spring-loaded and/or mat utilize ball detents.

Each or all of the floor lighting elements 300 may be an LED (e.g., an OLED, high intensity LED, LED strip, LED rope, etc.), a bulb, an EL strip (e.g., EL ribbon, etc.), or other type lighting elements. The floor lighting elements 300 may be configured to be illuminated as a single color (e.g., red, green, blue, white, yellow, purple, etc.) or multiple colors (e.g., red/green/blue, etc.).

In various embodiments, the floor lighting elements 300 are in electronic communication with the controller 217 and the memory 222 includes (e.g., in addition to the apron module 224, etc.) a floor module 316. The floor module 316 is configured to control operation of the floor lighting elements 300. For example, the floor module 316 may be configured to cause individual ones, or all, of the floor lighting elements 300 to illuminate individual ones, or all, of the floor illumination targets 302.

The controller 217 may be configured to control operation of the floor lighting elements 300 in response to receiving the signal from the sensor 228. For example, as shown in FIG. 1, the sensor 228 may be incorporated into the apron 118 and configured to detect a change of light in front of the apron 118 or motion in front of the apron 118. In this example, the controller 217 may be configured to illuminate one or all of the floor lighting elements 300 in response to detecting the change in light (e.g., the light proximate the apron drops below a threshold and the floor lighting elements 300 are desired as a 'night light,' etc.) or the detected motion.

Where the timer module 230 is included, the timer module 230 may be configured to control operation of the floor lighting elements 300 (e.g., independent of the floor module 316, in conjunction with the floor module 316, etc.). For example, the timer module 230 may be configured to cause individual ones, or all, of the floor lighting elements 300 to illuminate individual ones, or all, of the floor illumination targets 302 in response to a time counter exceeding a time counter threshold. The time counter may be reset by the timer module 230 in response to an event, such as a motion detected by the sensor 228 or a change in light detected by the sensor 228.

Where the lighting system 200 includes the button 232, the button 232 may be configured to control operation of the floor lighting elements 300. For example, the button 232 may be configured to cause individual ones, or all, of the floor lighting elements 300 to illuminate individual ones, or all, of the floor illumination targets 302.

The lighting system 200 also includes at least one rim lighting unit 400 (e.g., light source, illumination element, illumination source, etc.), according to an example embodiment. Each rim lighting unit 400 includes at least one rim lighting element 401 (e.g., light source, illumination element, illumination source, etc.). The lighting system 200 may include only the rim lighting units 400 (e.g., and not include any of the apron lighting elements 202 or any of the floor lighting elements 300, etc.), only the apron lighting elements 202 (e.g., and not include any of the rim lighting units 400 or any of the floor lighting elements 300, etc.), only include the floor lighting elements 300 (e.g., and not include any of the apron lighting elements 202 or any of the rim lighting units 400, etc.), include at least one of the apron lighting elements 202 and at least one of the rim lighting units 400 (e.g., and not include any of the floor lighting elements 300, etc.), include at least one of the floor lighting elements 300 and at least one of the rim lighting units 400 (e.g., and not include any of the apron lighting elements 202, etc.), include at least one of the apron lighting elements 202 and at least one of the floor lighting elements 300 (e.g., and not include any of the rim lighting units 400, etc.), or include at least one of the apron lighting elements 202, at least one of the floor lighting elements 300, and at least one of the rim lighting units 400.

The rim lighting elements 401 are configured to illuminate at least one of the bottom wall 104, the front wall 108, the first side wall 110, the rear wall 112, or the second side wall 114. For example, the rim lighting elements 401 may illuminate the bottom wall 104, the front wall 108, the first side wall 110, the rear wall 112, and the second side wall 114. In addition to increasing lighting within the basin 102 such that operations within the basin 102 (e.g., cleaning dishes, etc.) are made easier (e.g., because a user can more easily see dishes within the basin 102 during low-light conditions, etc.), the rim lighting elements 401 may also utilize the basin 102 to produce a 'glow' effect. This 'glow' effect can illuminate a space surrounding the sink system 100 and could be utilized as a 'night light.'

Each of the rim lighting elements 401 provides illumination to at least one rim illumination target 402 disposed on a rim lighting unit cover 404 (e.g., lens, cap, etc.) of the rim lighting unit 400. The rim lighting unit cover 404 substantially prohibits ingress of fluid (e.g., water, etc.) to the rim lighting elements 401.

The rim lighting units 400 are configured to be coupled to (e.g., attached to, etc.) an undersurface 406 (e.g., bottom surface, etc.) of the counter 130 between the basin rim 116 and an exterior face 407 of the counter 130. For example, the rim lighting units 400 may include adhesive strips that can be utilized to adhesively couple the rim lighting elements 401 to the undersurface 406. As a result, the rim lighting units 400 are located within an overhang of the counter 130. By being located within the overhang of the counter 130.

Figure 12:
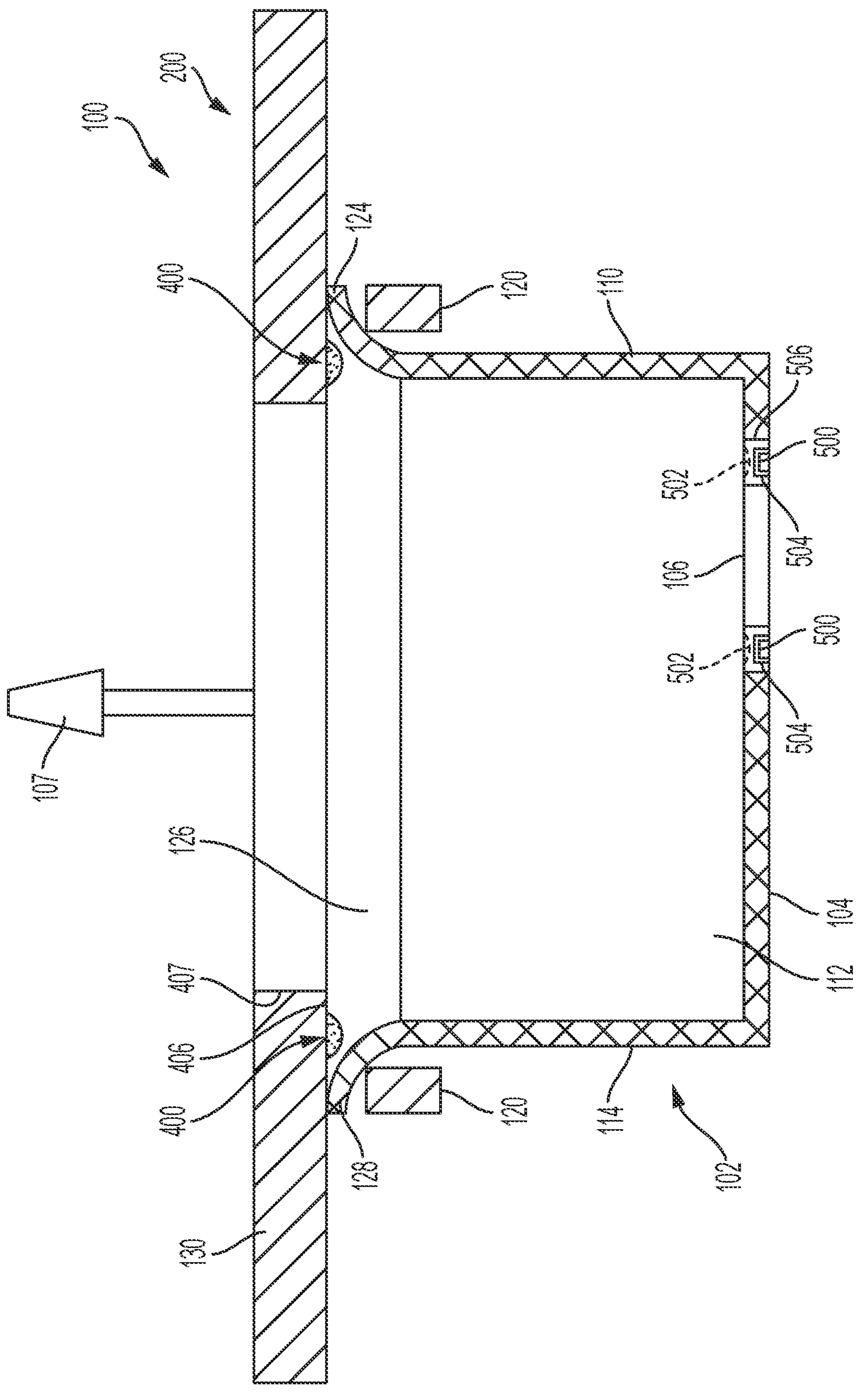
FIG. 12 is a cross-sectional view of yet another sink system, according to an example embodiment.

As shown in FIG. 12, one of the rim lighting units 400 is coupled to the undersurface 406 between the rim first side 124 and the exterior face 407 and another of the rim lighting units 400 is coupled to the undersurface 406 between the rim second side 128 and the exterior face 407.

The lighting system 200 may include any number of the rim lighting units 400, any number of the rim lighting elements 401, and any number of the rim illumination targets 402. For example, the lighting system 200 may include one, two, five, ten, or more of the rim lighting units 400 and/or one, two, five, ten, twenty, fifty, or one-hundred of the rim lighting elements 401 and/or of the rim illumination targets 402. In FIG. 1, for example, the lighting system 200 includes two of the rim lighting units 400, each having three of the rim lighting elements 401 and three of the rim illumination targets 402.

The illumination provided by the rim lighting elements 401 may make the sink system 100 more desirable because the basin 102 can provide specific aesthetic and functional benefits. Aesthetically, the rim illumination targets 402 may provide an ambient lighting (e.g., as a night light, etc.). Functionally, the rim illumination targets 402 may assist a user in approaching the basin 102 and interacting with objects (e.g., dishes, etc.) within the basin 102 such that the sink system 100 can be utilized in low-lighting conditions (e.g., at night, etc.).

In some embodiments, each of the rim lighting elements 401 is configured to illuminate their own rim illumination target 402, such that the number of the rim lighting elements 401 is equal to the number of the rim illumination targets 402.

In some embodiments, any or all of the rim lighting elements 401 are configured to illuminate a plurality of the rim illumination targets 402. For example, a first of the rim lighting elements 401 is configured to illuminate a first of the rim illumination targets 402 and a second of the rim lighting elements 401 is configured to illuminate two or more of the rim illumination targets 402 different from the first of the rim illumination targets 402. In some embodiments, two of the rim lighting elements 401 may be configured to illuminate the same rim illumination target 402.

Each or all of the rim lighting elements 401 may be an LED (e.g., an OLED, high intensity LED, LED strip, LED rope, etc.), a bulb, an EL strip (e.g., EL ribbon, etc.), or other type lighting elements. The rim lighting elements 401 may be configured to be illuminated as a single color (e.g., red, green, blue, white, yellow, purple, etc.) or multiple colors (e.g., red/green/blue, etc.).

In some embodiments, the rim lighting elements 401 are in electronic communication with an electrical grid (e.g., home electrical grid, kitchen electrical grid, etc.) or a battery. In some of these embodiments, the rim lighting elements 401 may be connected to the electrical grid or the battery via a cord (e.g., with a plug that can be connected to a wall socket, to the battery located underneath the counter 130 and separated from the basin 102, etc.). Where a cord is utilized, a rim slot 408 (e.g., cut-out, etc.) may be included in the basin rim 116 for routing of the cord through the basin rim 116. As shown in FIG. 1, a first of the rim slots 408 is disposed in the rim first side 124 (e.g., for routing of the cord from a first of the rim lighting units 400, etc.) and a second of the rim slots 408 is disposed in the rim second side 128 (e.g., for routing of the cord from a second of the rim lighting unit 400, etc.). However, the rim slot 408 may, additionally or alternatively, be disposed in the rim front side 122 and/or the rim rear side 126.

In various embodiments, the rim lighting elements 401 are in electronic communication with the controller 217 and the memory 222 includes (e.g., in addition to the apron module 224, in addition to the floor module 316, in addition to the apron module 224 and the floor module 316, etc.) a rim module 409. The rim module 409 is configured to control operation of the rim lighting elements 401. For example, the rim module 409 may be configured to cause individual ones, or all, of the rim lighting elements 401 to illuminate individual ones, or all, of the rim illumination targets 402.

The controller 217 may be configured to control operation of the rim lighting elements 401 in response to receiving the signal from the sensor 228. For example, as shown in FIG. 1, the sensor 228 may be incorporated into the apron 118 and configured to detect a change of light in front of the apron 118 or motion in front of the apron 118. In this example, the controller 217 may be configured to illuminate one or all of the rim lighting elements 401 in response to detecting the change in light (e.g., the light proximate the apron drops below a threshold and the rim lighting elements 401 are desired as a 'night light,' etc.) or the detected motion.

Where the timer module 230 is included, the timer module 230 may be configured to control operation of the rim lighting elements 401 (e.g., independent of the rim module 409, in conjunction with the rim module 409, etc.). For example, the timer module 230 may be configured to cause individual ones, or all, of the rim lighting elements 401 to illuminate individual ones, or all, of the rim illumination targets 402 in response to a time counter exceeding a time counter threshold. The time counter may be reset by the timer module 230 in response to an event, such as a motion detected by the sensor 228 or a change in light detected by the sensor 228.

Where the lighting system 200 includes the button 232, the button 232 may be configured to control operation of the rim lighting elements 401. For example, the button 232 may be configured to cause individual ones, or all, of the rim lighting elements 401 to illuminate individual ones, or all, of the rim illumination targets 402.

The lighting system 200 also includes at least one drain lighting element 500 (e.g., light source, illumination element, illumination source, etc.), according to an example embodiment. The lighting system 200 may include only the drain lighting elements 500 (e.g., and not include any of the apron lighting elements 202, any of the floor lighting elements 300, or any of the rim lighting units 400, etc.), only the rim lighting units 400 (e.g., and not include any of the apron lighting elements 202, any of the floor lighting elements 300, or any of the drain lighting elements 500, etc.), only the floor lighting elements 300 (e.g., and not include any of the apron lighting elements 202, any of the rim lighting units 400, or any of the drain lighting elements 500, etc.), only the apron lighting elements 202 (e.g., and not include any of the floor lighting elements 300, any of the rim lighting units 400, or any of the drain lighting elements 500, etc.), include at least one of the rim lighting units 400 and at least one of the floor lighting elements 300 (e.g., and not include any of the apron lighting elements 202 or any of the drain lighting elements 500, etc.), include at least one of the rim lighting units 400 and at least one of the apron lighting elements 202 (e.g., and not include any of the floor lighting elements 300 or any of the drain lighting elements 500, etc.), include at least one of the rim lighting units 400 and at least one of the drain lighting elements 500 (e.g., and not include any of the floor lighting elements 300 or any of the apron lighting elements 202, etc.), include at least one of the floor lighting elements 300 and at least one of the apron lighting elements 202 (e.g., and not include any of the rim lighting units 400 or any of the drain lighting elements 500, etc.), include at least one of the floor lighting elements 300 and at least one of the drain lighting elements 500 (e.g., and not include any of the rim lighting units 400 or any of the apron lighting elements 202, etc.), or include at least one of the apron lighting elements 202 and at least one of the drain lighting elements 500 (e.g., and not include any of the rim lighting units 400 or any of the floor lighting elements 300, etc.).

The drain lighting elements 500 are configured to illuminate the bottom wall 104 around (e.g., about, etc.) the drain 106. Light provided by the drain lighting elements 500 illuminates the basin 102, thereby assisting assist a user in using the sink system 100 (e.g., at night, etc.) and/or may provide an aesthetically pleasing and unobtrusive ambient lighting in a room (e.g., kitchen, etc.) where the sink system 100 is installed. Each of the drain lighting elements 500 provides illumination to at least one drain illumination target 502 disposed on the bottom wall 104. In other words, a portion (e.g., the drain illumination target 502, etc.) of the bottom wall 104 is illuminated by the lighting system 200.

The lighting system 200 may include any number of the drain lighting elements 500 and any number of the drain illumination targets 502. For example, the lighting system 200 may include one, two, five, ten, twenty, fifty, or one-hundred of the drain lighting elements 500 and/or of the drain illumination targets 502. In FIG. 2, for example, the lighting system 200 includes eight of the drain lighting elements 500 and eight of the drain illumination targets 502.

The bottom wall 104 and the drain lighting elements 500 cooperate to provide the illumination from the drain lighting elements 500 to the drain illumination targets 502. In various embodiments, such as is shown in FIG. 12, the bottom wall 104 includes a plurality of drain illumination apertures 504 (e.g., bores, holes, etc.). Each of the drain illumination apertures 504 provides an avenue (e.g., by forming a light pipe, etc.) for light to travel from at least one of the drain lighting elements 500 to at least one of the drain lighting elements 500. In some embodiments, the drain illumination apertures 504 are formed in the bottom wall 104 via a mold or via machining (e.g., post-molding machining, etc.). In other embodiments, the drain illumination apertures 504 are formed via fiber optic conduits that are embedded as the bottom wall 104 is formed.

In various embodiments, such as is shown in FIGS. 2 and 12, the lighting system 200 also includes at least one drain lighting element cover 506 (e.g., lens, cap, etc.). Each of the drain illumination apertures 504 is covered (e.g., overlapped, sealed, etc.) by one of the drain lighting element covers 506. In this way, ingress of fluid (e.g., water, etc.) through the drain illumination apertures 504 towards the drain lighting elements 500 is substantially prohibited. Each of the drain illumination targets 502 may be on one of the drain lighting element covers 506. The drain lighting element covers 506 may be initially separate from the basin 102 and coupled to the bottom wall 104 (e.g., via an adhesive, etc.). Additionally, the drain lighting element cover 506 may be a translucent and/or transparent portion of the bottom wall 104. For example, the bottom wall 104 may be at least partially constructed from a translucent and/or transparent material which forms the drain lighting element covers 506 such that the drain illumination apertures 504 terminate at the drain lighting element covers 506, and the translucent and/or transparent material of the drain lighting element covers 506 conveys the light from the drain illumination apertures 504 to the drain illumination targets 502. In one example, as shown in FIG. 2, the bottom wall 104 includes a translucent and/or transparent material that forms a single drain lighting element cover 506 and the drain illumination targets 502 are all disposed on the drain lighting element cover 506. In some embodiments where the bottom wall 104 includes a translucent and/or transparent material that forms the drain lighting element covers 506, the bottom wall 104 does not include the drain illumination apertures 504 (e.g., the drain lighting elements 500 are encapsulated within the bottom wall 104, etc.).

The illumination provided by the drain lighting elements 500 may make the sink system 100 more desirable because the basin 102 can provide specific aesthetic and functional benefits. Aesthetically, the drain illumination targets 502 may provide an ambient lighting (e.g., as a night light, etc.). Functionally, the drain illumination targets 502 may assist a user in interacting with objects within the basin 102 such that the sink system 100 can be utilized in low-lighting conditions (e.g., at night, etc.). Additionally, the drain illumination targets 502 may assist the user in being aware of the location of the drain 106, such that insertion of objects (e.g., utensils, fingers, etc.) into the drain 106 is avoided.

In some embodiments, the lighting system 200 may be configured with the drain lighting elements 500 being strips that are applied to an exterior (e.g., bottom, lower, etc.) surface of the bottom wall 104. In these embodiments, the drain lighting elements 500 are applied over the drain illumination apertures 504 or the bottom wall 104 includes a translucent and/or transparent material that forms the drain lighting element covers 506 and the bottom wall 104 does not include the drain illumination apertures 504.

In some embodiments, the lighting system 200 includes a plurality of drain lighting elements 500, each configured to illuminate their own drain illumination target 502, such that the number of the drain lighting elements 500 is equal to the number of the drain illumination targets 502.

In some embodiments, any or all of the drain lighting elements 500 are configured to illuminate a plurality of the drain illumination targets 502. For example, a first of the drain lighting elements 500 is configured to illuminate a first of the drain illumination targets 502 and a second of the drain lighting elements 500 is configured to illuminate two or more of the drain illumination targets 502 different from the first of the drain illumination targets 502. In some embodiments, two of the drain lighting elements 500 may be configured to illuminate the same drain illumination target 502.

Figure 13:
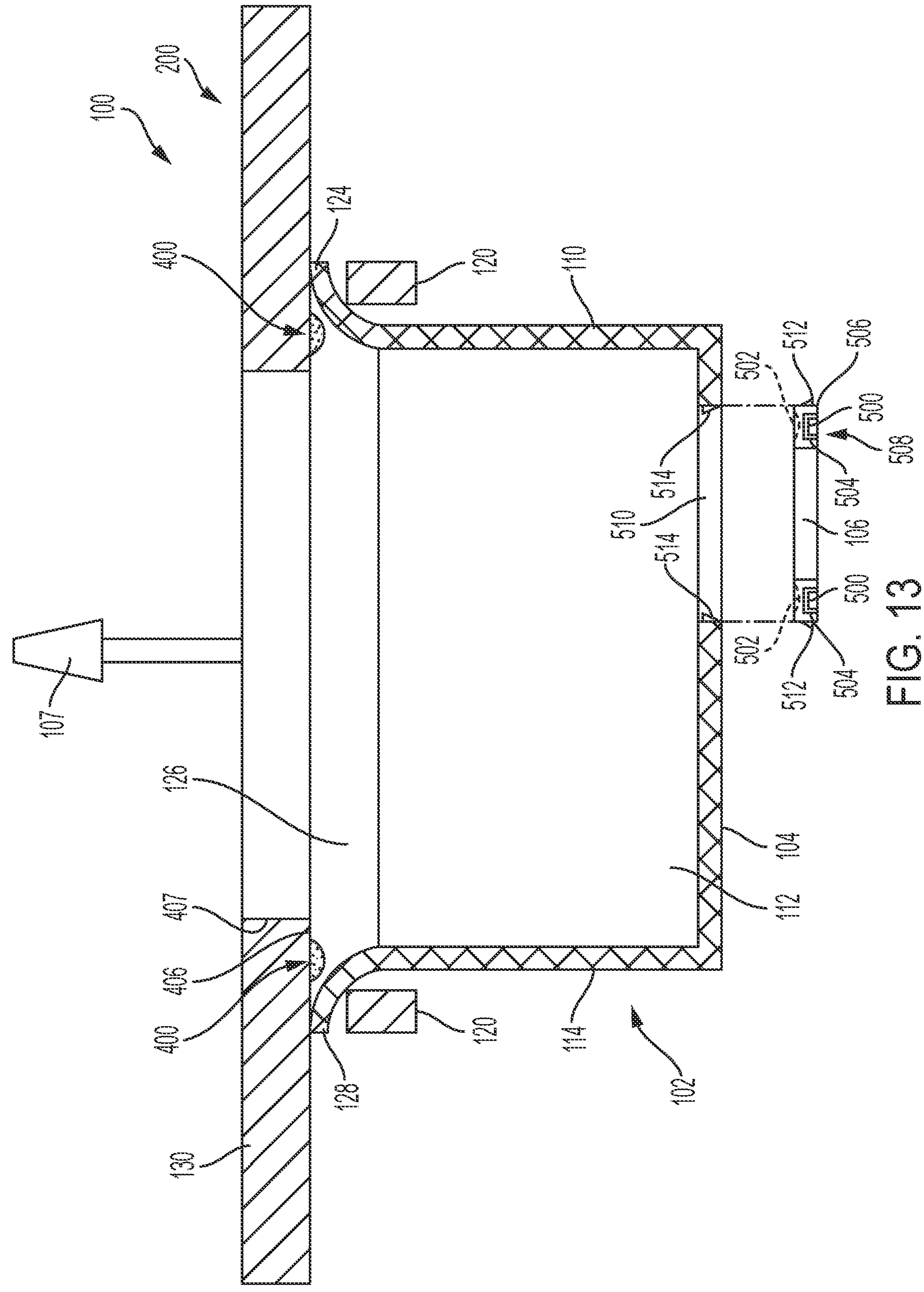
FIG. 13 is a cross-sectional view of yet another sink system, according to an example embodiment.

As shown in FIG. 13, the sink system 100 further includes a drain section 508 (e.g., bottom wall modular section, etc.). The drain section 508 is configured to be received within a drain receptacle 510 (e.g., bottom wall receiver, slot, opening, window, channel, etc.) formed in the bottom wall 104. In these embodiments, the drain lighting elements 500, the drain illumination target 502, the drain illumination apertures 504, and the drain lighting element covers 506 are included within the drain section 508. For example, the drain lighting elements 500, the drain illumination target 502, the drain illumination apertures 504, and the drain lighting element covers 506 may be included within the drain section 508 only and are not included within the bottom wall 104.

The drain section 508 is configured to be selectively coupled to, and decoupled from, the drain receptacle 510. For example, the drain receptacle 510 may be inserted into the drain receptacle 510 from the bottom. In this way, one drain section 508 may be removed and replaced with another drain section 508. As a result, the aesthetic appearance of the bottom wall 104 may be rapidly and easily adjusted. In another example, one drain section 508 without the drain lighting elements 500, the drain illumination target 502, the drain illumination apertures 504, and the drain lighting element covers 506 may be replaced with another drain section 508 including the drain lighting elements 500, the drain illumination target 502, the drain illumination apertures 504, and the drain lighting element covers 506. As a result, capabilities of the sink system 100 may be rapidly and easily adjusted.

In various embodiments, the drain section 508 includes drain section retainers 512 (e.g., clips, connectors, etc.) and the bottom wall 104 includes drain receptacle retainers 514 (e.g., clips, connectors, etc.). The drain section retainers 512 and the drain receptacle retainers 514 cooperate to facilitate coupling and decoupling of the drain section 508 and the drain receptacle 510. The drain section retainers 512 and the drain receptacle retainers 514 may be, for example, spring-loaded and/or mat utilize ball detents.

Each or all of the drain lighting elements 500 may be an LED (e.g., an OLED, high intensity LED, LED strip, LED rope, etc.), a bulb, an EL strip (e.g., EL ribbon, etc.), or other type lighting elements. The drain lighting elements 500 may be configured to be illuminated as a single color (e.g., red, green, blue, white, yellow, purple, etc.) or multiple colors (e.g., red/green/blue, etc.).

In various embodiments, the drain lighting elements 500 are in electronic communication with the controller 217 and the memory 222 includes (e.g., in addition to the apron module 224, in addition to the floor module 316, in addition to the rim module 409, in addition to the apron module 224 and the floor module 316, in addition to the apron module 224, the floor module 316, and the rim module 409, in addition to the floor module 316 and the rim module 409, etc.) a drain module 516. The drain module 516 is configured to control operation of the drain lighting elements 500. For example, the drain module 516 may be configured to cause individual ones, or all, of the drain lighting elements 500 to illuminate individual ones, or all, of the drain illumination targets 502.

The controller 217 may be configured to control operation of the drain lighting elements 500 in response to receiving the signal from the sensor 228. For example, as shown in FIG. 1, the sensor 228 may be incorporated into the apron 118 and configured to detect a change of light in front of the apron 118 or motion in front of the apron 118. In this example, the controller 217 may be configured to illuminate one or all of the drain lighting elements 500 in response to detecting the change in light (e.g., the light proximate the apron drops below a threshold and the drain lighting elements 500 are desired as a 'night light,' etc.) or the detected motion.

Where the timer module 230 is included, the timer module 230 may be configured to control operation of the drain lighting elements 500 (e.g., independent of the drain module 516, in conjunction with the drain module 516, etc.). For example, the timer module 230 may be configured to cause individual ones, or all, of the drain lighting elements 500 to illuminate individual ones, or all, of the drain illumination targets 502 in response to a time counter exceeding a time counter threshold. The time counter may be reset by the timer module 230 in response to an event, such as a motion detected by the sensor 228 or a change in light detected by the sensor 228.

Where the lighting system 200 includes the button 232, the button 232 may be configured to control operation of the drain lighting elements 500. For example, the button 232 may be configured to cause individual ones, or all, of the drain lighting elements 500 to illuminate individual ones, or all, of the drain illumination targets 502.

Figure 14:
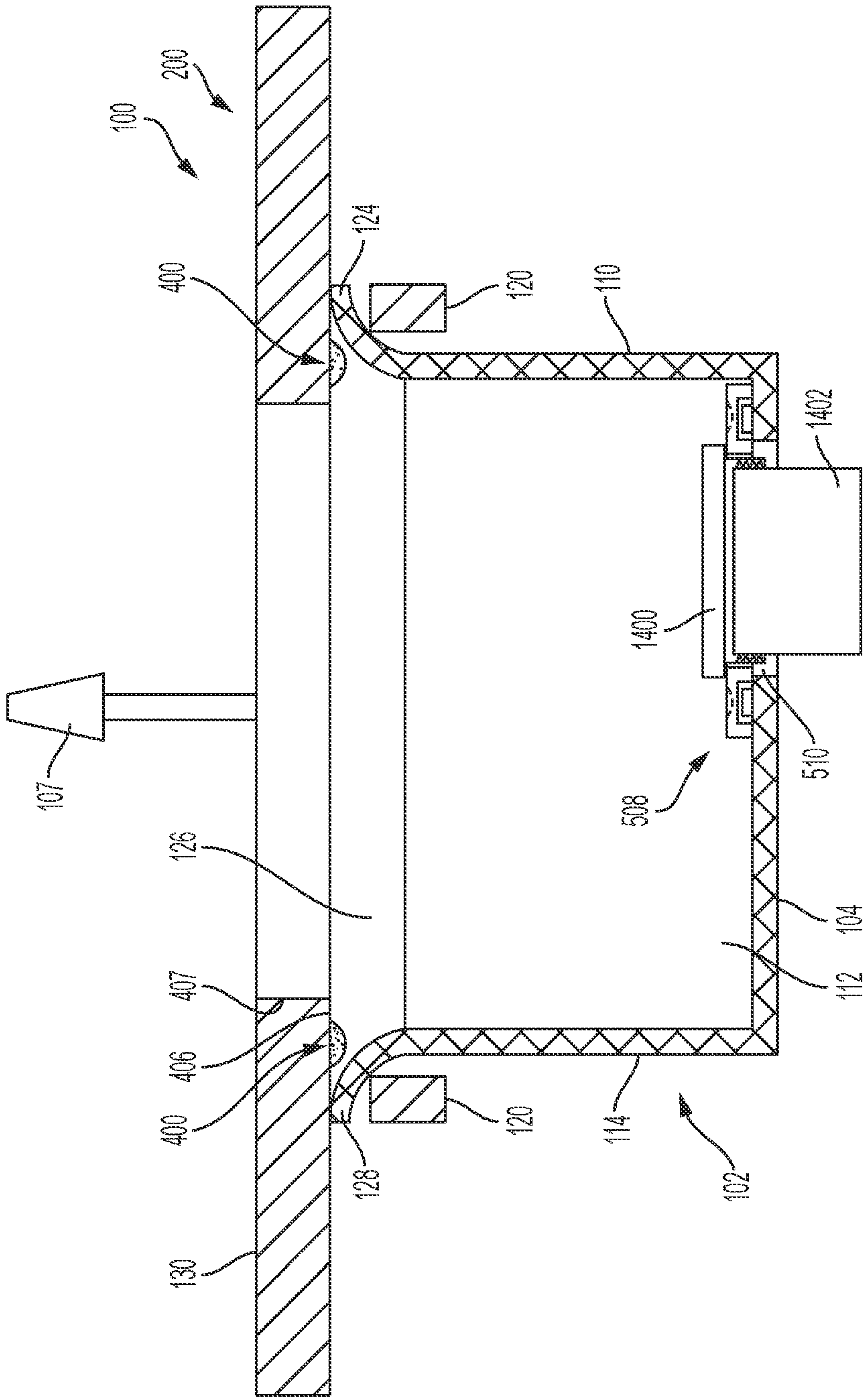
FIG. 14 is a cross-sectional view of yet another sink system, according to an example embodiment.
Figure 15:
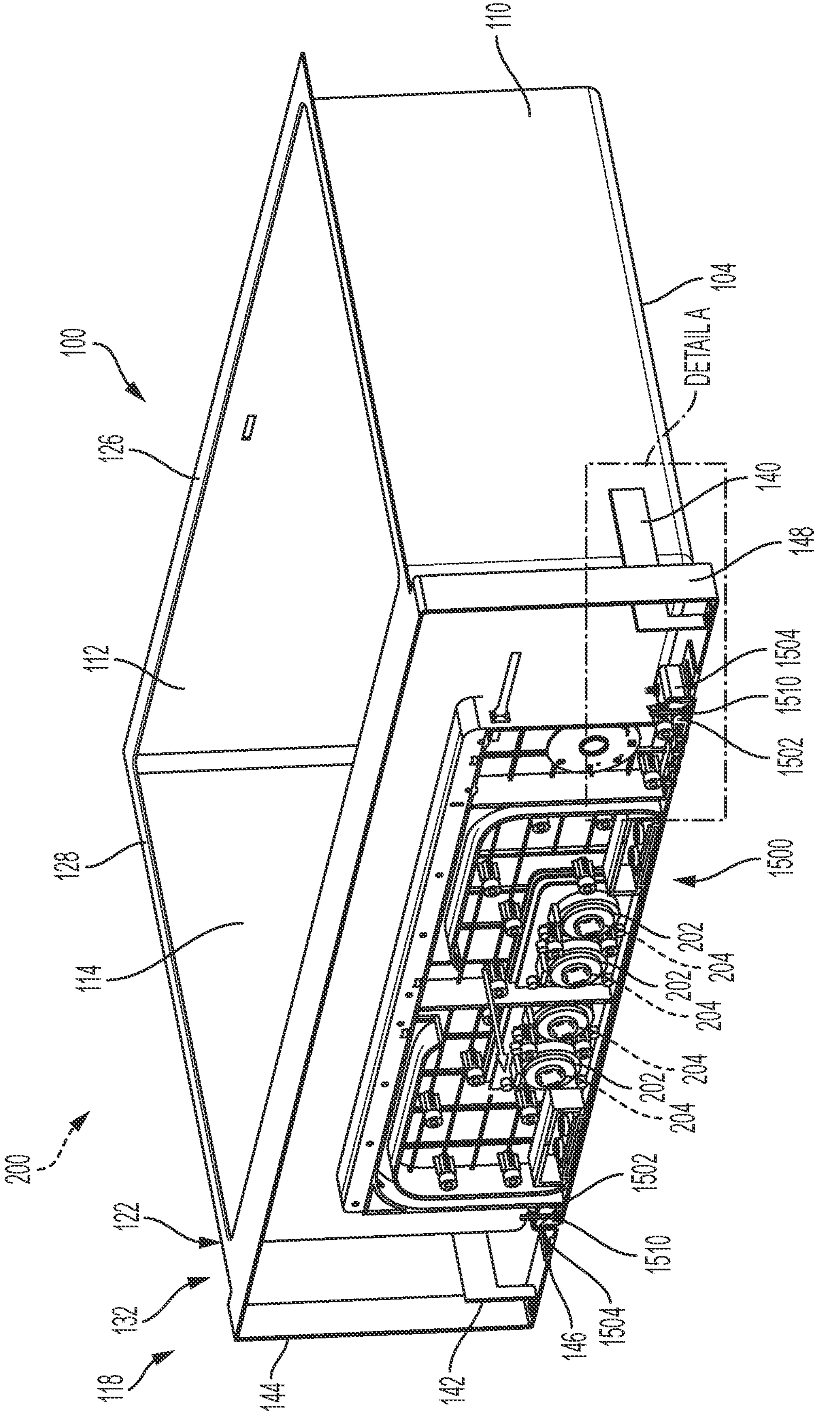
FIG. 15 is a front perspective view of yet another sink system, according to an example embodiment.
Figure 16:
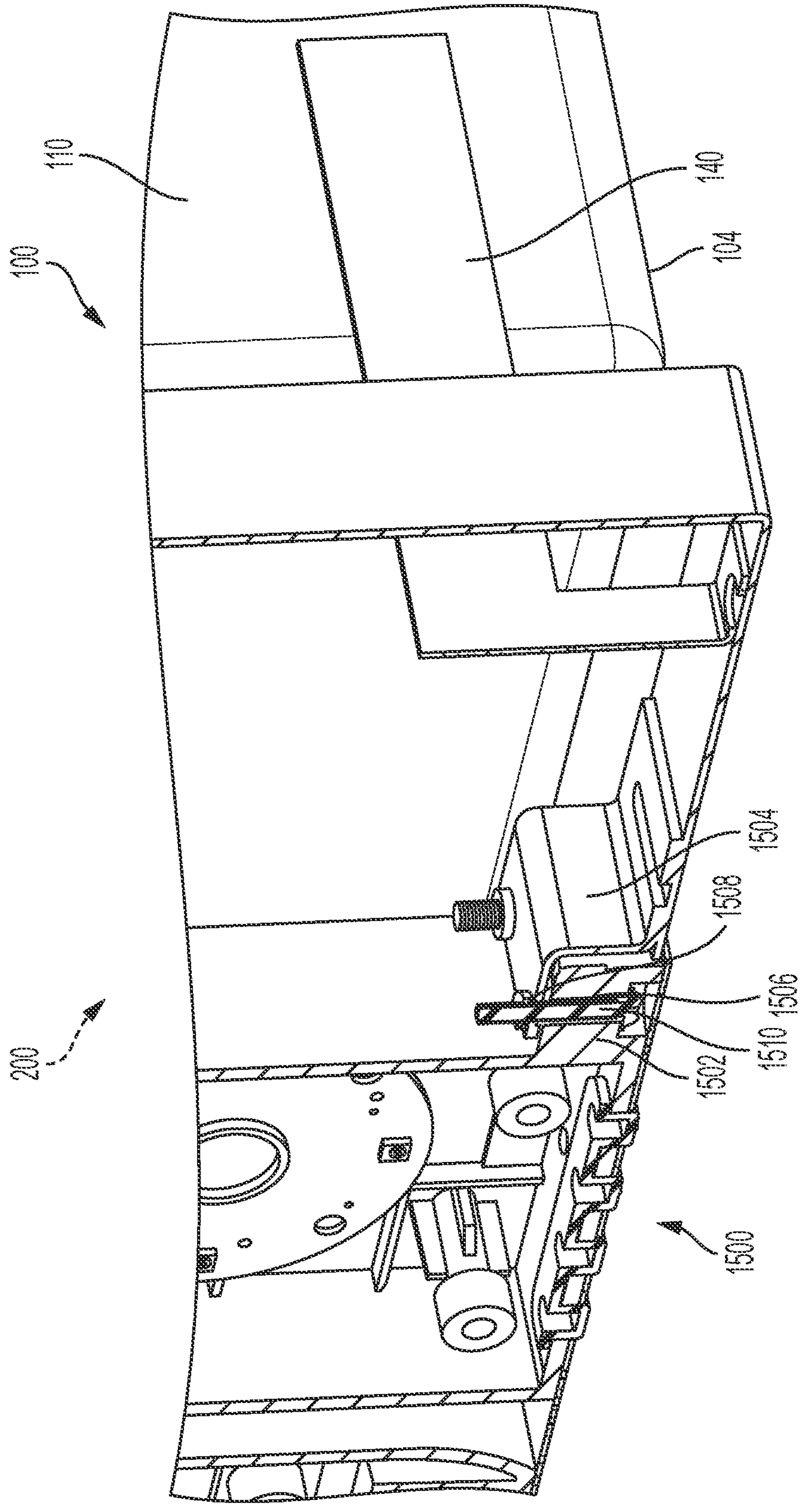
FIG. 16 is a detailed view of DETAIL A of the sink system shown in FIG. 15.
Figure 17:
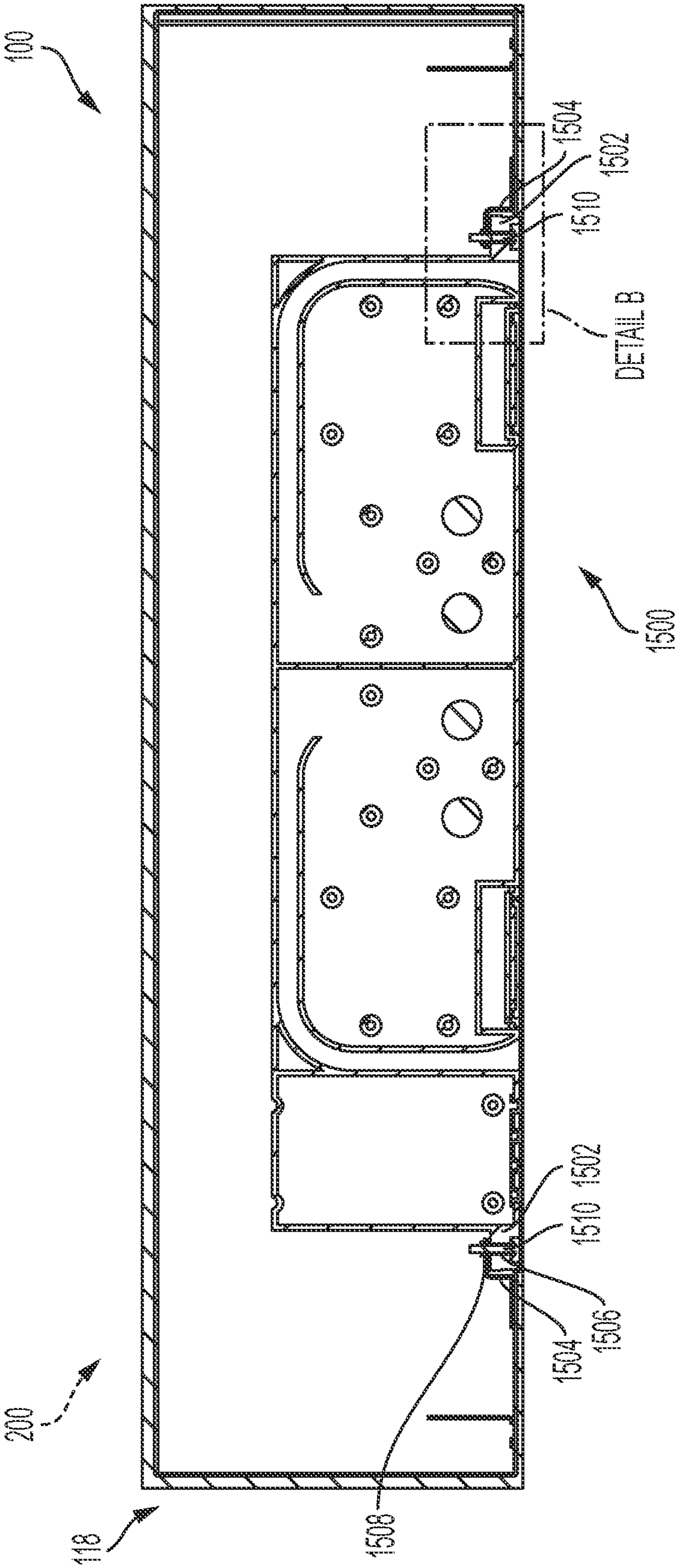
FIG. 17 is a front view of the sink system shown in FIG. 15.
Figure 18:
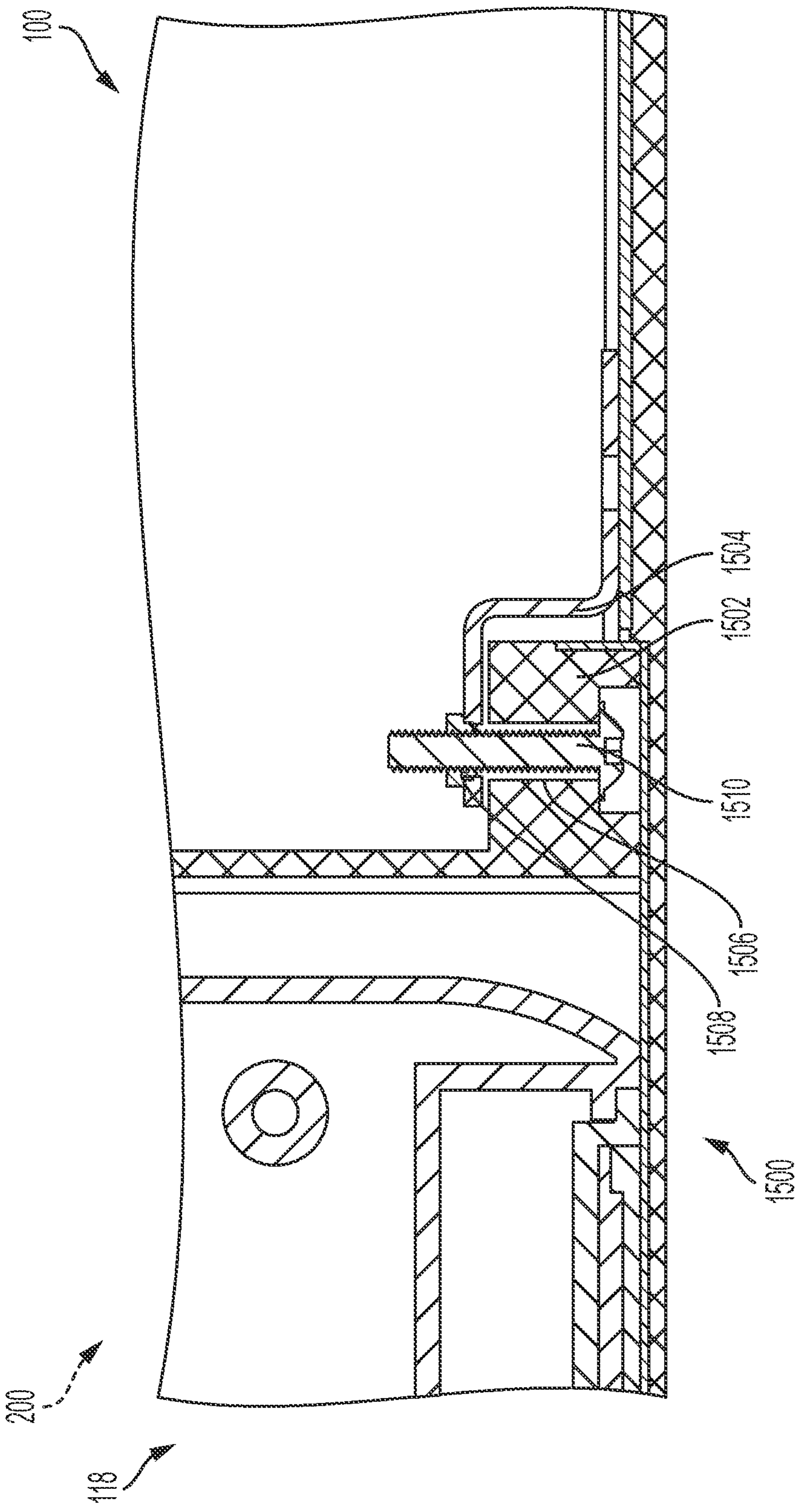
FIG. 18 is a detailed view of DETAIL B of the sink system shown in FIG. 17.

In some embodiments, such as is shown in FIG. 14, the drain section 508 is captured between a mounting nut 1400 (e.g., bezel, etc.) and the bottom wall 104 due to an interaction between the mounting nut 1400, the bottom wall 104, and a drain fitting 1402. Specifically, the mounting nut 1400 and the drain fitting 1402 are threaded together so as to cause the drain section 508 to be captured between the mounting nut 1400 and the bottom wall 104. In these embodiments, the drain section 508 may be compressible such that the drain section 508 compresses when the mounting nut 1400 and the drain fitting 1402 are threaded together. This compression may provide for a seal to be established between the mounting nut 1400 and the drain section 508 and another seal to be established between the drain section 508 and the bottom wall 104. These seals cooperate to substantially prohibit leakage of fluid between the mounting nut 1400 and the bottom wall 104.

FIGS. 15-19 illustrate the sink system 100 and the lighting system 200 according to various embodiments, and with certain components (e.g., the apron panel wall 134, etc.) hidden. The lighting system 200 includes an apron section 1500 (e.g., apron modular section, etc.). The apron section 1500 is similar to the apron section 210. However, rather than including the apron section retainers 214, the apron section 1500 includes an apron section projection 1502 (e.g., tongue, wall, etc.).

The apron section projection 1502 is configured to be received within an apron receptacle ledge member 1504 (e.g., bracket, etc.). The apron receptacle ledge member 1504 is contiguous with the apron receptacle 212. In some embodiments, the apron receptacle ledge member 1504 (e.g., where the apron receptacle ledge member 1504 is a bracket, etc.) is coupled to the apron 118. In other embodiments, the apron receptacle ledge member 1054 is integrally formed with the apron 118.

The apron section projection 1502 includes an apron section aperture 1506 (e.g., hole, slot, etc.). Similarly, the apron ledge member 1504 includes an apron ledge aperture 1508 (e.g., hole, slot, etc.). The apron section aperture 1506 is aligned with the apron ledge aperture 1508 when the apron section projection 1502 is received within the apron receptacle ledge member 1504. The sink system 100 further includes apron section fasteners 1510 (e.g., bolts, push rivets. threaded fasteners, expandable rivet, etc.) that extend through the apron section apertures 1506 and the apron ledge apertures 1508 to couple the apron section 1500 to the apron 118. In some embodiments, the apron section fasteners 1510 are expanding push in rivets. Terminal ends of the apron section fasteners 1510 may be covered with a cap (e.g., rubber grommet, etc.).

Figure 19:
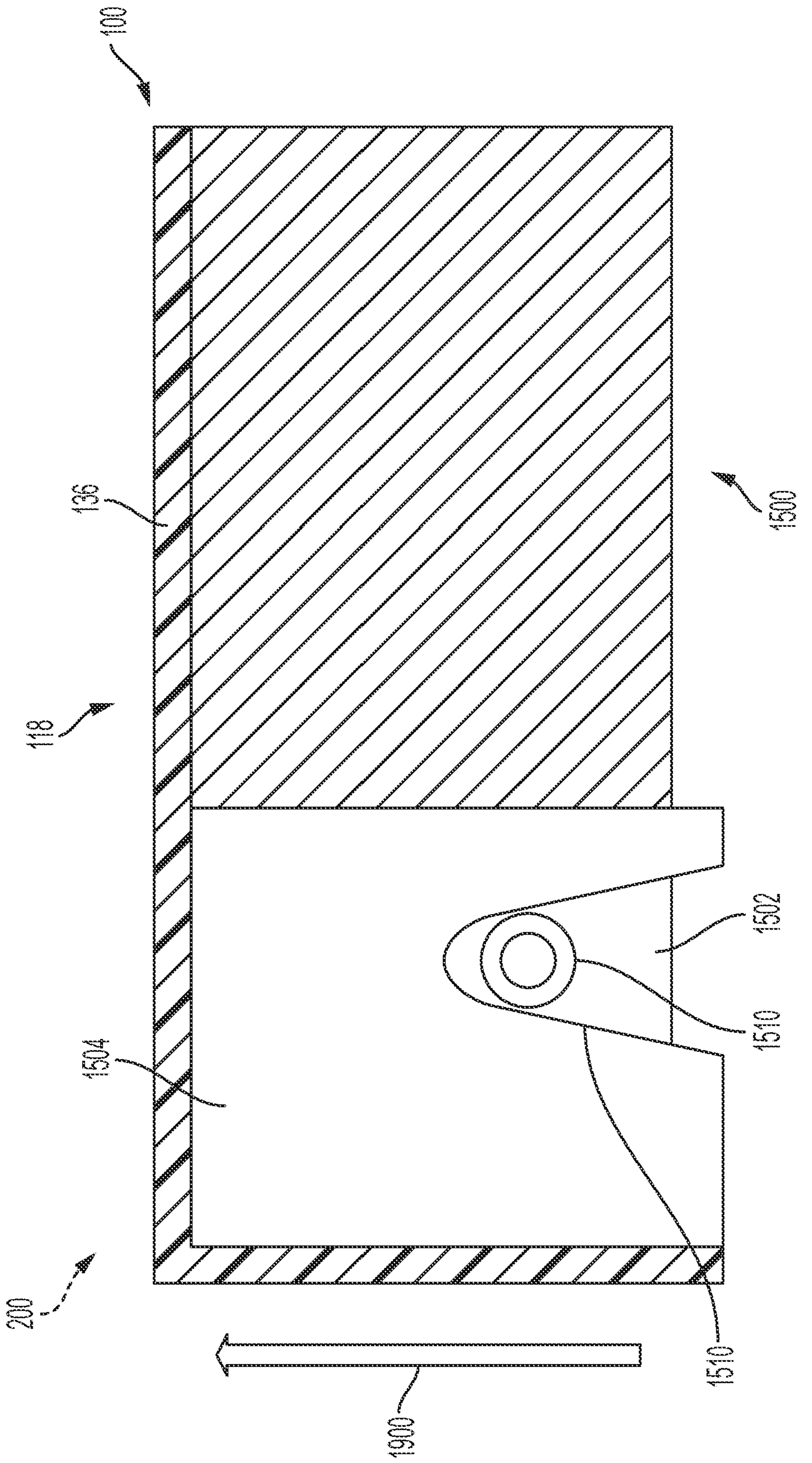
FIG. 19 is a cross-sectional view of a portion of the sink system shown in FIG. 17.

As shown in FIG. 19, the apron ledge aperture 1508 is a slot and the apron section fastener 1510 is an expandable rivet, press-in grommet, or similar fastener. The apron ledge aperture 1508 may have minimal draft. In these embodiments, the apron 118 may be formed via an ejection process and in an ejection direction 1900 that is orthogonal to the exterior surface 136. The ejection direction 1900 is from the interior surface 138 to the exterior surface 136.

Figure 20:
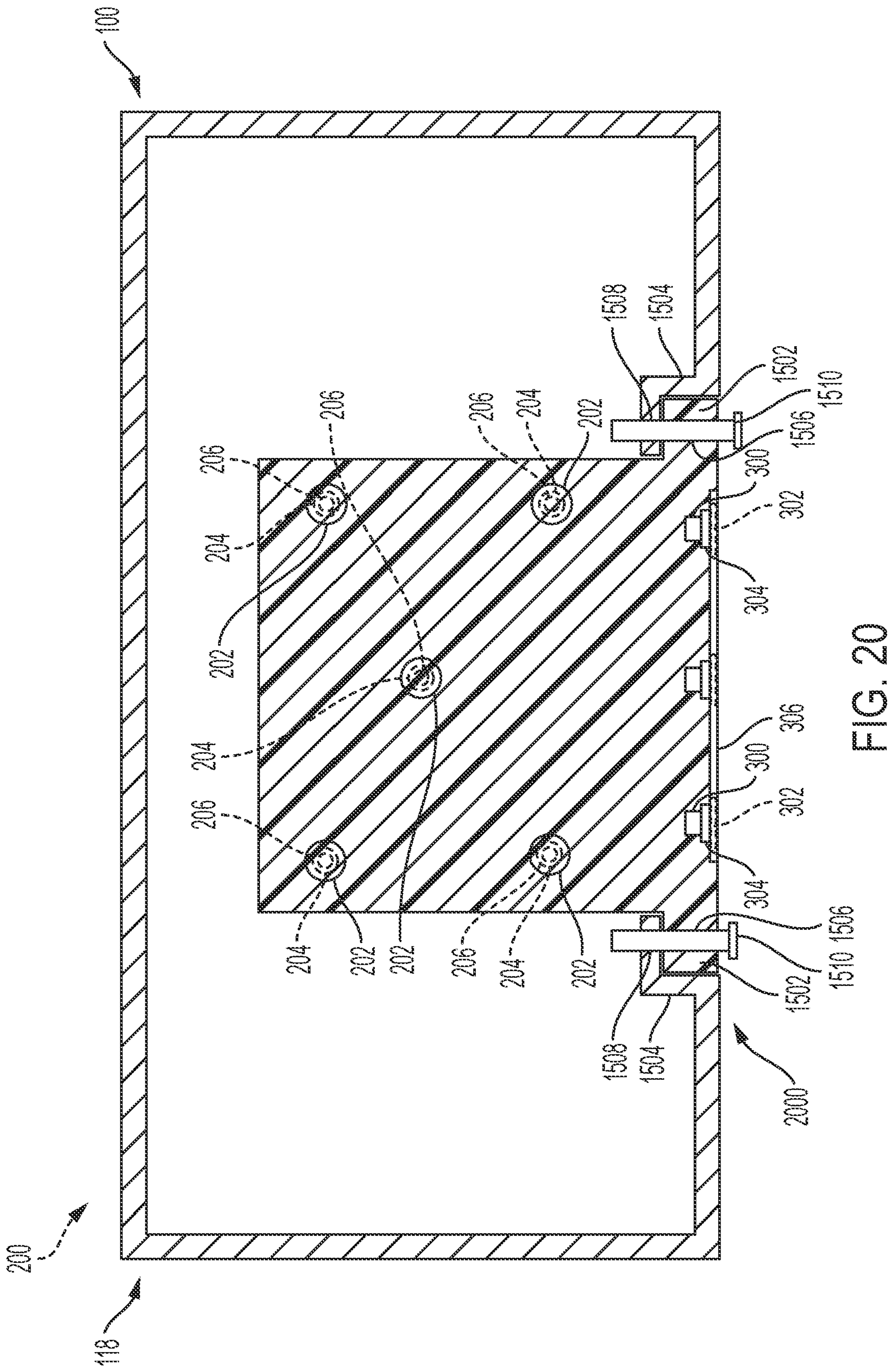
FIG. 20 is a cross-sectional view of a portion of yet another sink system, according to an example embodiment.

FIG. 20 illustrates the sink system 100 and the lighting system 200 according to various embodiments, and with certain components (e.g., the apron panel wall 134, etc.) hidden. The lighting system 200 includes an apron section 2000 (e.g., apron modular section, etc.). The apron section 2000 is similar to the apron section 1500, but also incorporates the floor lighting elements 300, the floor illumination target 302, the floor illumination apertures 304, and the floor lighting element covers 306, thereby combining the floor section 308 with the apron section 1500.

Figure 21:
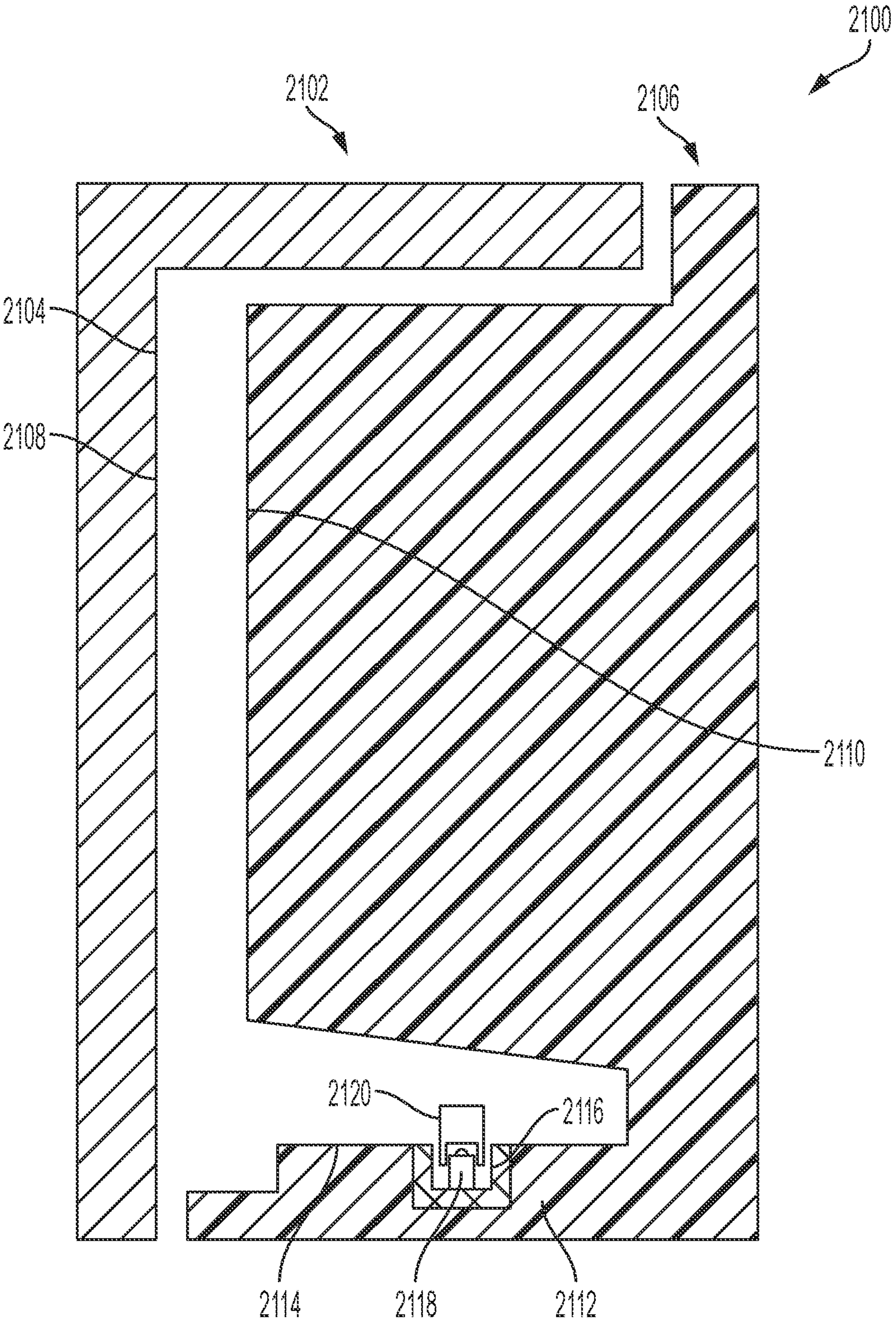
FIG. 21 is a cross-sectional view of a manufacturing assembly for manufacturing an apron for a sink system, according to an example embodiment.

FIG. 21 illustrates a manufacturing assembly 2100 (e.g., tooling assembly, etc.) for manufacturing (e.g., forming, constructing, etc.) the apron 118. The manufacturing assembly 2100 includes an apron exterior tool 2102 (e.g., mold, core, etc.). The apron exterior tool 2102 includes an apron exterior tool interior surface 2104 (e.g., face, etc.). As is explained in more detail herein, the exterior surface 136 forms on the apron exterior tool interior surface 2104. Therefore, target characteristics of the exterior surface 136 may be attained by variously configuring the apron exterior tool interior surface 2104. For example, the exterior surface 136 may be formed with texturing when the apron exterior tool interior surface 2104 includes texturing.

The manufacturing assembly 2100 also includes an apron interior tool 2106 (e.g., mold, core, etc.). The apron interior tool 2106 and the apron exterior tool 2102 cooperate to define an apron tool cavity 2108 (e.g., void, etc.). The manufacturing assembly 2100 includes an injector that provides material into the apron tool cavity 2108 for forming the apron 118.

The apron interior tool 2106 includes an apron interior tool core 2110 and an apron interior tool ledge 2112. The apron tool core 2108 is disposed adjacent the apron exterior tool interior surface 2104. By variously configuring the apron interior tool core 2110 and the apron interior tool ledge 2112, the apron 118 can be formed in various shapes and with various configurations.

The apron interior tool ledge 2112, the apron interior and the apron tool core 2108 cooperate to define an apron ledge cavity 2114. Each of the apron ledge members 1504 is formed in one of the apron ledge cavities 2114. The apron interior tool ledge 2112 includes a ledge aperture 2116 (e.g., hole, etc.) and a detent 2118 (e.g., ball and spring detent, spring loaded detent, etc.) located within the ledge aperture 2116. The detent 2118 is configured to be coupled to an insert 2120 (e.g., knurled inserted, etc.) that is embedded within apron ledge member 1504 as the apron ledge member 1504 is formed. The insert 2120 may facilitate coupling of an apron section (e.g., the apron section 1500, etc.) to the apron ledge member 1504 via the apron section fastener 1510. The detent 2118 facilitates de-coupling (e.g., via retraction of the detent 2118, etc.) of the insert 2120 from the apron interior tool ledge 2112 after the apron 118 has been formed and the apron interior tool 2106 is separated from the apron exterior tool 2102. Prior to being embedded within the apron ledge member 1504, the insert 2120 may be sealed to the apron interior tool ledge 2112 (e.g., around the ledge aperture 2116, etc.) using a sealant (e.g., silicone, glue, etc.) so as to mitigate ingress of material into the ledge aperture 2116.

In various embodiments, the apron interior tool ledge 2112 further includes a magnet 2122 (e.g., neodymium magnet, etc.) disposed within the apron interior tool ledge 2112 around the ledge aperture 2116. The magnet 2122 may bias the insert 2120 towards the apron interior tool ledge 2112 (e.g., due to a magnetic attraction of the insert 2120 towards the magnet 2122, etc.), thereby enhancing sealing between the insert 2120 and the apron interior tool ledge 2112.

Figure 22:
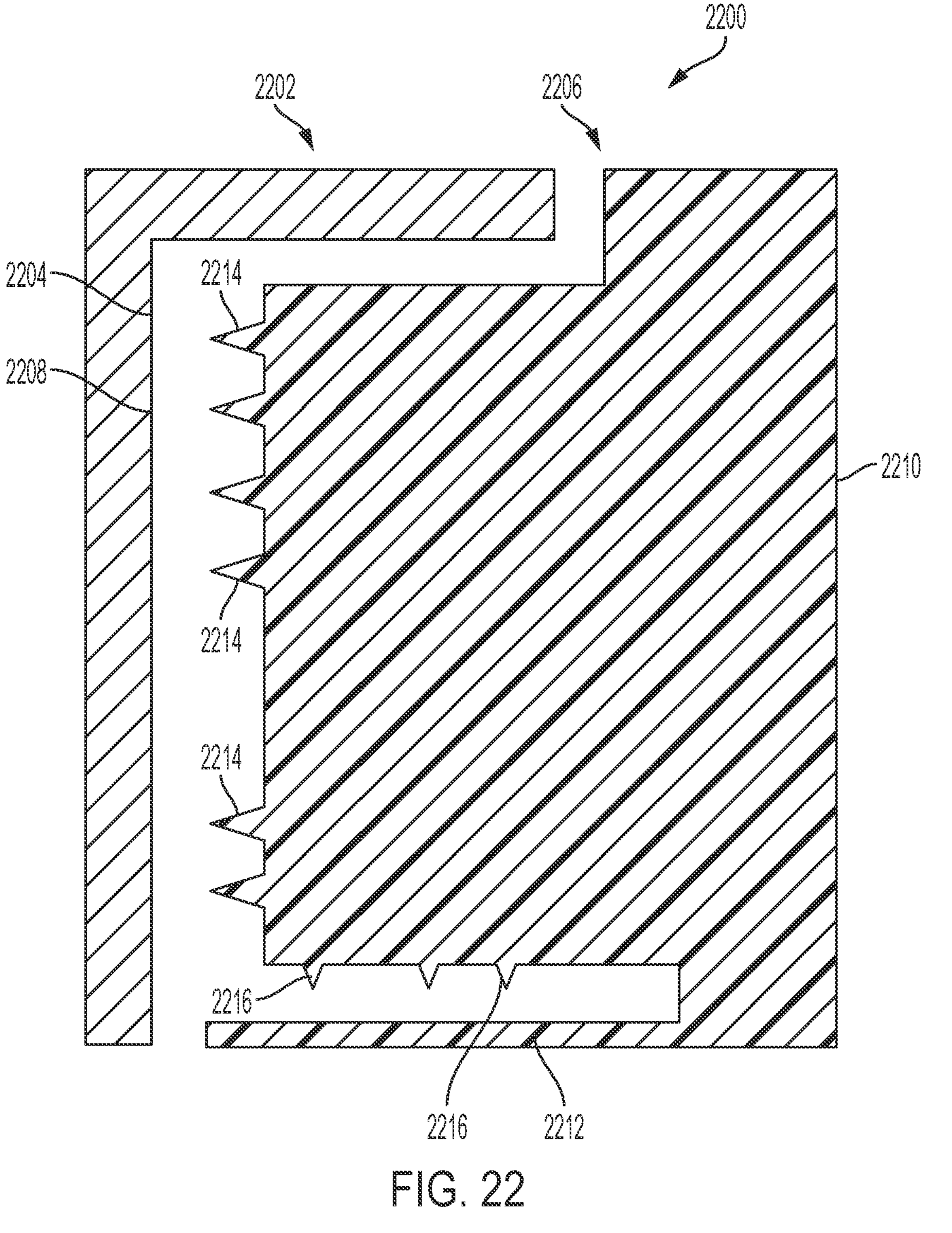
FIG. 22 is a cross-sectional view of another manufacturing assembly for manufacturing an apron for a sink system, according to an example embodiment.

FIG. 22 illustrates a manufacturing assembly 2200 (e.g., tooling assembly, etc.) for manufacturing (e.g., forming, constructing, etc.) the apron 118. The manufacturing assembly 2200 includes an apron exterior tool 2202 (e.g., mold, core, etc.). The apron exterior tool 2202 includes an apron exterior tool interior surface 2204 (e.g., face, etc.). As is explained in more detail herein, the exterior surface 136 forms on the apron exterior tool interior surface 2204. Therefore, target characteristics of the exterior surface 136 may be attained by variously configuring the apron exterior tool interior surface 2204. For example, the exterior surface 136 may be formed with texturing when the apron exterior tool interior surface 2204 includes texturing.

The manufacturing assembly 2200 also includes an apron interior tool 2206 (e.g., mold, core, etc.). The apron interior tool 2206 and the apron exterior tool 2202 cooperate to define an apron tool cavity 2208 (e.g., void, etc.). The manufacturing assembly 2200 includes an injector that provides material into the apron tool cavity 2208 for forming the apron 118.

The apron interior tool 2206 includes an apron interior tool core 2210 and an apron interior tool ledge 2212. The apron tool core 2208 is disposed adjacent the apron exterior tool interior surface 2204. By variously configuring the apron interior tool core 2210 and the apron interior tool ledge 2212, the apron 118 can be formed in various shapes and with various configurations.

In various embodiments, the apron interior tool core 2210 includes core projections 2214 (e.g., posts, pegs, points, etc.). The core projections 2214 form the apron apertures 206 within the apron 118 as the apron 118 is formed within the manufacturing assembly 2200.

In various embodiments, the apron interior tool ledge 2212 includes ledge projections 2216 (e.g., posts, pegs, points, etc.). The ledge projections 2216 form the floor apertures 304 within the apron 118 as the apron 118 is formed within the manufacturing assembly 2200.

Figure 23:
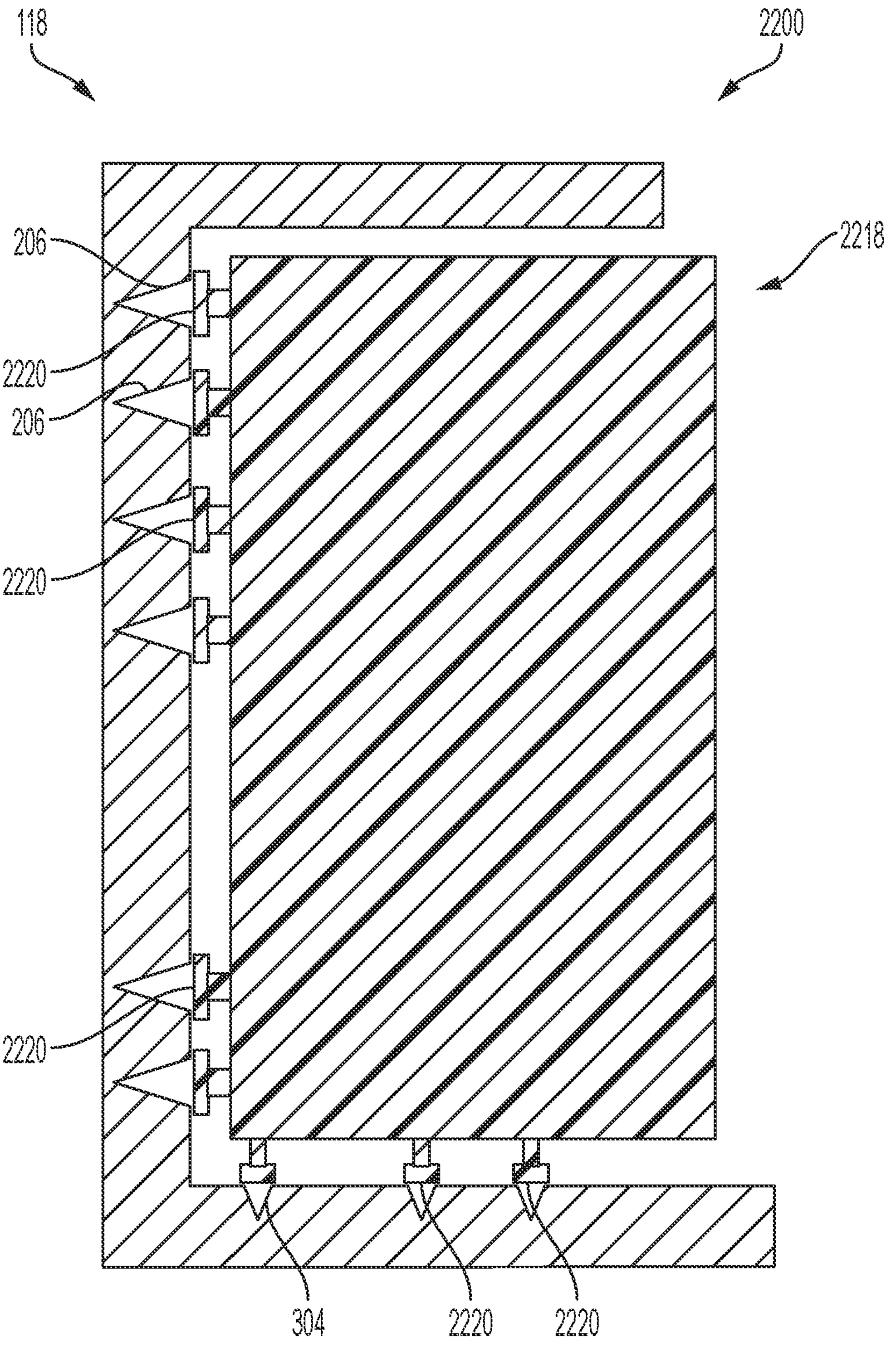
FIG. 23 is another cross-sectional view of the manufacturing assembly shown in FIG. 22.

In some embodiments, the manufacturing assembly 2200 includes a post-forming tool 2218, as shown in FIG. 23. The post-forming tool 2218 includes a plurality of tools 2220 (e.g., reamers, drills, bits, etc.), each of which is configured to be aligned with one of the apron apertures 206 or one of the floor apertures 304. The tools 2220 are each configured to inserted into, or be placed in confronting relation with, the apron aperture 206 or the floor aperture 304 to remove flashing around the apron aperture 206 or the floor aperture 304. Diameters of each tool 2220 may be selected independent of the other tools 2220 such that the apron 118 is tailored for a target application.

IV. Construction of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the term "approximately," "generally," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the present disclosure as recited in the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the system shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the application, the scope being defined by the claims that follow. When the language "a portion" is used, the item can include a portion and/or the entire item unless specifically stated to the contrary.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W to P, etc.) herein are inclusive of their maximum values and minimum values (e.g., W to P includes Wand includes P, etc.), unless otherwise indicated. Furthermore, a range of values (e.g., W to P, etc.) does not necessarily require the inclusion of intermediate values within the range of values (e.g., W to P can include only Wand P, etc.), unless otherwise indicated.

What is claimed is:

1. A sink system comprising:

a basin comprising:

a bottom wall, a drain disposed within the bottom wall, a front wall contiguous with the bottom wall, and a basin rim contiguous with the front wall and separated from the bottom wall by the front wall;

an apron coupled to the basin rim, the apron comprising an apron panel wall having an interior surface and an exterior surface opposite the interior surface, the interior surface being in confronting relation with the front wall; and a lighting system comprising:

a lighting element coupled to the apron, the lighting element configured to provide illumination to an illumination target, and a controller in electronic communication with the lighting element and configured to selectively cause the lighting element to provide illumination to the illumination target, an apron receiver formed in the apron; and a modular section configured to be inserted into the apron receiver from the rear via a translation along a direction from the interior surface toward the exterior surface.

2. The sink system of claim 1, wherein the lighting element is disposed within the modular section; and wherein the illumination target is disposed within the modular section.

3. The sink system of claim 1, wherein the apron receiver comprises an apron receptacle.

4. The sink system of claim 1, wherein the lighting element comprises an apron lighting element.

5. The sink system of claim 1, wherein the modular section further comprises a lighting element cover, and the illumination target is disposed within the lighting element cover.

6. The sink system of claim 1, wherein the lighting system further includes:

a floor lighting element in electronic communication with the controller, and configured to provide illumination to a floor illumination target, wherein the controller is configured to selectively cause the floor lighting element to provide illumination to the floor illumination target.

7. The sink system of claim 1, wherein:

the modular section comprises a modular section retainer;

the apron receiver comprises an apron receiver retainer;

the apron receiver retainer is configured to cooperate with the modular section retainer to facilitate coupling and decoupling of the modular section and the apron receiver; and the modular section retainer is configured to cooperate with the apron receiver retainer to facilitate coupling and decoupling of the modular section and the apron receiver.

8. The sink system of claim 1, wherein:

the lighting system further comprises a sensor incorporated into the apron and configured to produce a signal after detecting at least one of: a motion proximate the apron or a change of light proximate the apron; and the controller is configured to selectively cause the lighting element to provide illumination to the illumination target based on the signal.

9. The sink system of claim 1, further comprising a plurality of lighting elements and a plurality of illumination targets, wherein the controller is configured to independently activate each one of the plurality of lighting elements to enable selective illumination of one or more of the plurality of illumination targets.

10. The sink system of claim 1, wherein the lighting system further includes:

a floor lighting element in electronic communication with the controller, and configured to provide illumination to a floor illumination target, wherein the controller is configured to selectively cause the floor lighting element to provide illumination to the floor illumination target.

11. A sink system comprising:

a basin;

an apron coupled to a portion of the basin; and a lighting system comprising:

a lighting element coupled to the apron, the lighting element configured to provide illumination to an illumination target, and a controller in electronic communication with the lighting element and configured to selectively cause the lighting element to provide illumination to the illumination target, an apron receiver formed in the apron; and a modular section configured to be inserted into the apron receiver from the rear via a translation along a direction from the basin toward the apron, wherein the lighting element is disposed within the modular section; and wherein the illumination target is disposed within the modular section.

12. The sink system of claim 11, wherein the lighting element is disposed within the modular section; and wherein the illumination target is disposed within the modular section.

13. The sink system of claim 11, wherein the apron receiver comprises an apron receptacle.

14. The sink system of claim 11, wherein the lighting element comprises an apron lighting element.

15. The sink system of claim 11, wherein the modular section further comprises a lighting element cover, and the illumination target is disposed within the lighting element cover.

16. An apron section configured to be selectively coupled to, and decoupled from, an apron receiver formed in an apron of a sink, comprising:

an apron lighting element disposed within the apron section, the apron lighting element configured to provide illumination to an apron illumination target, wherein the apron illumination target is disposed within the apron section, wherein a controller is in electronic communication with the apron lighting element and configured to selectively cause the apron lighting element to provide illumination to the apron illumination target, the apron section configured to be inserted into the apron receiver from the rear via a translation along a direction from an interior surface of the apron toward an exterior surface of the apron.

17. The apron section of claim 16, further comprising:

an apron section retainer, configured to cooperate with a corresponding retainer of the apron receiver so as to facilitate coupling and decoupling of the apron section with the apron receiver.

18. The apron section of claim 16, further comprising a sensor configured to produce a signal after detecting at least one of: a motion proximate the apron or a change of light proximate the apron, wherein the controller is configured to selectively cause the apron lighting element to provide illumination to the apron illumination target based on the signal.

19. The apron section of claim 16, further comprising a plurality of apron lighting elements and a plurality of apron illumination targets, wherein the controller is configured to independently activate each one of the plurality of apron lighting elements to enable selective illumination of one or more of the plurality of apron illumination targets.

* * * * *